(12) United States Patent
Gotoh

(10) Patent No.: US 8,355,168 B2
(45) Date of Patent: Jan. 15, 2013

(54) PROCESSING APPARATUS, IMAGE READING PROCESSING APPARATUS, IMAGE FORMING APPARATUS, IMAGE PROCESSING METHOD, AND STORAGE MEDIUM, ALL OF WHICH CARRY OUT AUTOMATIC COLOR SELECTION (ACS) REGARDLESS OF COLOR SETTING OF OUTPUT IMAGE DATA

(75) Inventor: Makio Gotoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 649 days.

(21) Appl. No.: 12/586,957

(22) Filed: Sep. 30, 2009

(65) Prior Publication Data

US 2010/0202000 A1 Aug. 12, 2010

(30) Foreign Application Priority Data

Feb. 6, 2009 (JP) ................................ 2009-026657

(51) Int. Cl.
*H04N 1/60* (2006.01)
(52) U.S. Cl. .................... 358/1.9; 358/1.13; 358/501
(58) Field of Classification Search ................... 358/1.1, 358/1.9, 1.13, 500, 501, 518
See application file for complete search history.

(56) References Cited

U.S. PATENT DOCUMENTS

| 5,282,026 A | 1/1994 | Nagata |
| 5,652,663 A | 7/1997 | Zelten |
| 6,876,824 B2 | 4/2005 | Maeda |
| 6,900,902 B1 * | 5/2005 | Tanaka .......................... 358/1.13 |
| 7,403,298 B2 | 7/2008 | Tanaka |

FOREIGN PATENT DOCUMENTS

| JP | 09-135316 A | 5/1997 |
| JP | 2005-286571 A | 10/2005 |
| JP | 2007-028336 A | 2/2007 |

OTHER PUBLICATIONS

U.S. Office Action dated Jun. 6, 2012 for U.S. Appl. No. 12/583,803.
U.S. Office Action dated Apr. 30, 2012 for U.S. Appl. No. 12/496,911.
U.S. Office Action dated Jun. 14, 2012 for U.S. Appl. No. 12/496,911.

* cited by examiner

*Primary Examiner* — Thomas D Lee
(74) *Attorney, Agent, or Firm* — Edwards Wildman Palmer LLP; David G. Conlin; David A. Tucker

(57) ABSTRACT

In an image processing apparatus, a color/monochrome determination section determines whether color image data is image data indicative of a color document or image data indicative of a monochrome document, regardless of which color setting is selected to output image data, and a control section stores a determination result and the color image data in a storage device so that they are correlated with each other. Upon receiving a change instruction to change the color setting, the control section generates output image data, following a color setting that is changed according to the change instruction, on the basis of the determination result and the color image data each stored in the storage device. As a result, even if the color setting is desired to be changed, it is possible to carry out output processing without reading the document from an image reading apparatus again.

10 Claims, 22 Drawing Sheets

SINGLE-COLOR MODE (AT THE TIME OF PREVIEW)

TWO-COLOR MODE (AT THE TIME OF PREVIEW)

F I G. 5 (a)
SINGLE-COLOR MODE (AT THE TIME OF RE-PREVIEW)
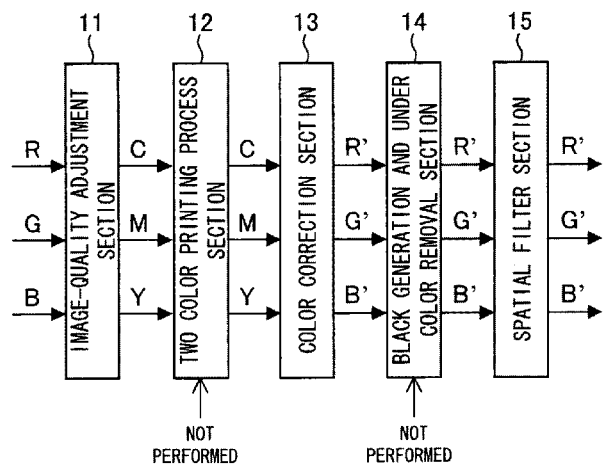
F I G. 5 (b)
TWO-COLOR MODE (AT THE TIME OF RE-PREVIEW)
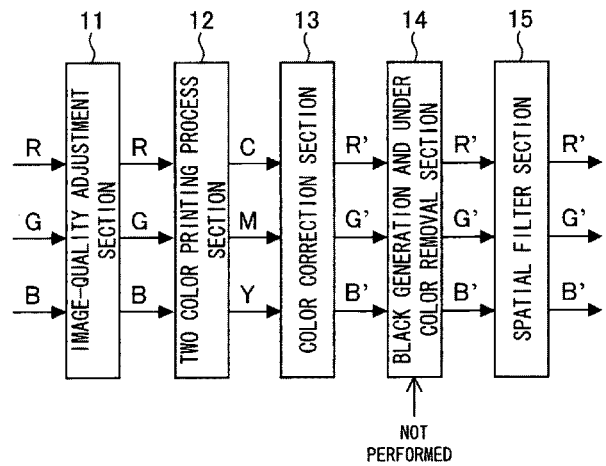

SINGLE-COLOR MODE (AT THE TIME OF PRINTING)

TWO-COLOR MODE (AT THE TIME OF PRINTING)

F I G. 8 (a)
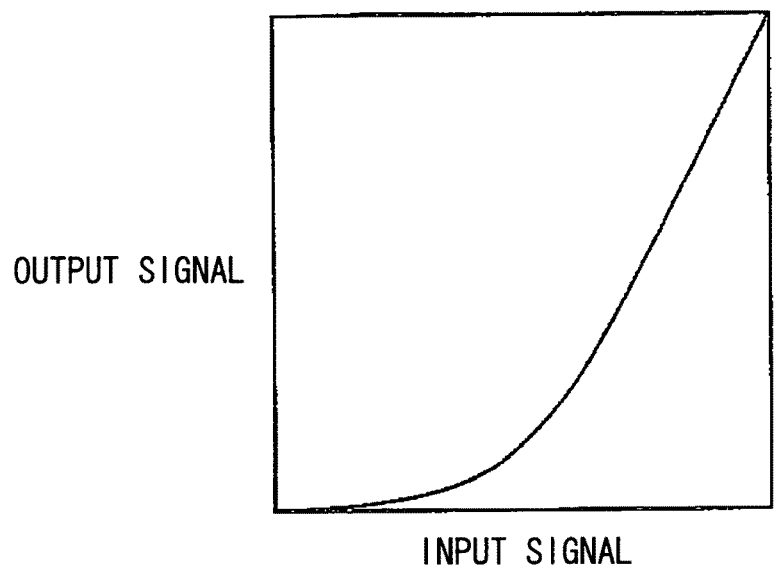
F I G. 8 (b)
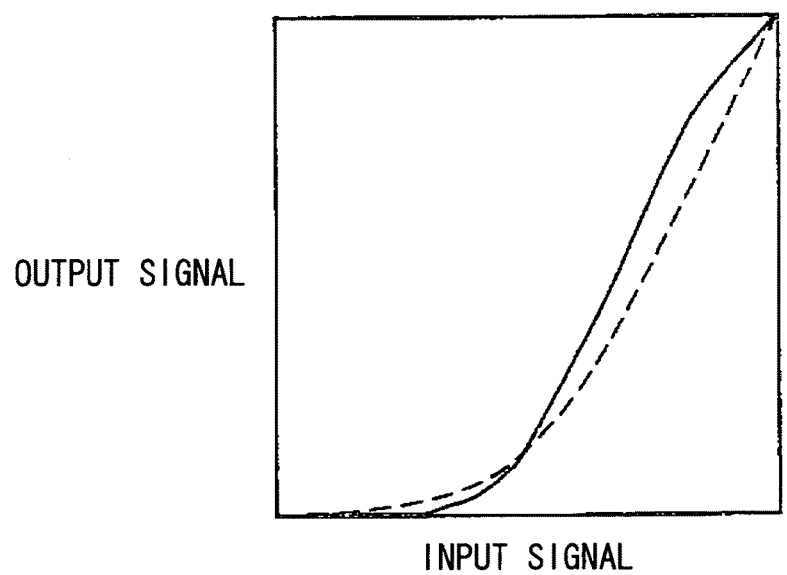

R COMPONENT

G COMPONENT

B COMPONENT

R COMPONENT

G COMPONENT

B COMPONENT

R COMPONENT

G COMPONENT

B COMPONENT

PROCESSING APPARATUS, IMAGE READING PROCESSING APPARATUS, IMAGE FORMING APPARATUS, IMAGE PROCESSING METHOD, AND STORAGE MEDIUM, ALL OF WHICH CARRY OUT AUTOMATIC COLOR SELECTION (ACS) REGARDLESS OF COLOR SETTING OF OUTPUT IMAGE DATA

This Nonprovisional application claims priority under 35 U.S.C. §119(a) on Patent Application No. 2009-026657 filed in Japan on Feb. 6, 2009, the entire contents of which are hereby incorporated by reference.

TECHNICAL FIELD

The present invention relates to an image processing apparatus, an image reading processing apparatus, an image forming apparatus, an image processing method, an image processing program, and a computer-readable storage medium, each of which carries out image processing with respect to input image data, following a selected color setting, and outputs output image data.

BACKGROUND ART

An image forming apparatus such as a copying machine or a multifunction printer carries out image processing with respect to image data of a target image to be printed in accordance with a document type and setting conditions (printing density, percentage for an enlarging/reducing process, one-side printing or two-sided printing, margin size, and the like). Furthermore, there are some image forming apparatuses that display a preview of the target image to be printed on a display section of a display apparatus, on the basis of the image data that has been subjected to the image processing. There are various types of how to display a preview, for example, a display type in which the target image to be printed is displayed on the display section page by page, and a display type in which target images to be printed, made up of a plurality of pages, are displayed on the display section at once.

Furthermore, there are some image forming apparatuses having a function of changing a color of an image to be printed out, following a color setting selected by a user. In this case, the user sets a full-color mode, a monochrome mode, or the like mode as the color setting. However, in some cases, the user does not know whether a document is a color document or a monochrome document. In view of this, some image forming apparatuses have an auto color selection (ACS) function for automatically determining whether the document is a color document or a monochrome document. For example, Japanese Patent Application Publication, Tokukai, No. 2001-83759 A (Publication Date: Mar. 30, 2001) discloses an image forming apparatus that carries out an ACS process only when an auto color selection mode (ACS mode) is set. Further, Japanese Patent Application Publication, Tokukai, No. 2004-4622 A (Publication Date: Jan. 8, 2004) discloses an image forming apparatus that can designate a mode (standard mode) for use in image formation when a user does not clearly designate which mode is to be used for forming an image, an auto color selection mode, a full-color mode, or a black-and-white mode.

In some cases, after a user once sets a full-color mode or a monochrome mode and a document is subjected to a reading process, the user may want to change the color setting. For example, there may be a case where, after the reading process, the user finds that there are a few color pages being mixed in black-and-white pages in the document and the user may want to print the few color pages in the full-color mode. Further, in a case where the preview display is carried out, there may be a case where the user may want to change the color setting when the user checks a preview of an image.

However, with such conventional arrangements, in the cases where the user wants to change the color setting after the document has been subjected to the reading process, it is necessary that printing should be completed in the color setting that is initially set and then the document should be reset to be subjected to the reading process again. Further, in this case, pieces of paper used for the printing in the initially-set color setting are wasted.

SUMMARY OF INVENTION

The present invention is accomplished in view of the above problems. An object of the present invention is to realize an image processing apparatus capable of carrying out output processing without reading a document from an image reading apparatus again even when a color setting is changed.

In order to achieve the above object, an image processing apparatus according to the present invention includes: output control means for generating, from color image data obtained by reading an image of a document as color with an image reading apparatus, output image data used in any one of an image print job, an image transmission job, and an image filing job, and outputting the generated output image data to a job apparatus that performs the corresponding job; color/monochrome determination means for determining whether the color image data is image data indicative of a color document or image data indicative of a monochrome document, regardless of which color setting is selected with respect to the output image data; storing means for storing a determination result of the color/monochrome determination means and the color image data in a storage device in association with each other; and change instruction receiving means for receiving a change instruction to change the color setting, in a case where the change instruction receiving means receives the change instruction, the output control means generating the output image data, following a color setting that is changed according to the change instruction, on the basis of the determination result and the color image data each stored in the storage device. Here, a monochrome image is generically referred to as a black-and-white binary image (an image made of two values of black and white) and a grayscale image (an image having gradation).

In the above arrangement, regardless of which color setting is initially selected, the image processing apparatus determines whether color image data of a document read by the image reading apparatus is image data indicative of a color document or image data indicative of a monochrome document. Then, the image processing apparatus stores a determination result and the color image data in the storage device so that they are correlated with each other. Further, upon receiving a change instruction to change the color setting, the image processing apparatus generates output image data from the determination result and the color image data each stored in the storage device, following a color setting that is changed in accordance with the change instruction.

As a result, it is advantageously possible that, even if the color setting is changed, the image processing apparatus of the present invention carries out output processing without reading the document from the image reading apparatus again.

In order to achieve the above object, an image processing method according to the present invention includes the steps of: (a) carrying out output control of generating, from color image data obtained by reading an image of a document as color with an image reading apparatus, output image data used in any one of an image print job, an image transmission job, and an image filing job, and outputting the output image data to a job apparatus that performs the corresponding jobs; (b) determining whether the color image data is image data indicative of a color document or image data indicative of a monochrome document, regardless of which color setting is selected with respect to the output image data; (c) storing a determination result in the step (b) and the color image data in a storage device in association with each other; and (d) receiving a change instruction to change the color setting, in the step (a), the output image data, following a color setting that is changed according to the change instruction, is generated, on the basis of the determination result and the color image data each stored in the storage device.

With the above arrangement, the image processing method according to the present invention has the same advantageous effect as that of the image processing apparatus according to the present invention.

Additional objects, features, and strengths of the present invention will be made clear by the description below. Further, the advantages of the present invention will be evident from the following explanation in reference to the drawings.

Figure 2:
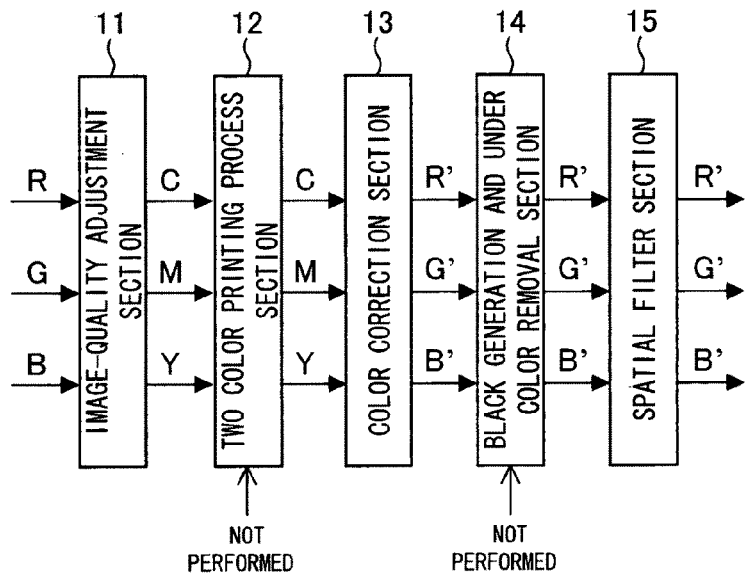
FIG. 2
Figure 2:
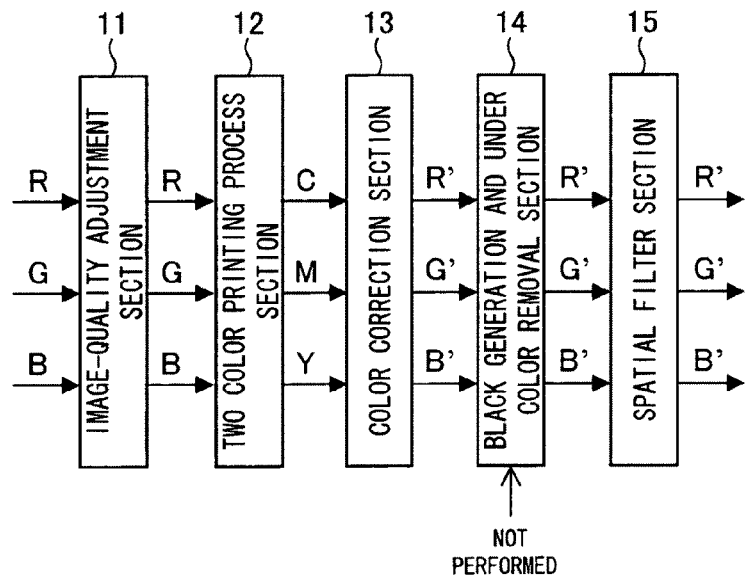

(a) of FIG. 2 is a block diagram partially showing an image processing apparatus at a time when a preview display is carried out in the copier mode and a single-color mode. (b) of FIG. 2 is a block diagram partially showing the image processing apparatus at a time when the preview display is carried out in the copier mode and a two-color mode.

Figure 3:
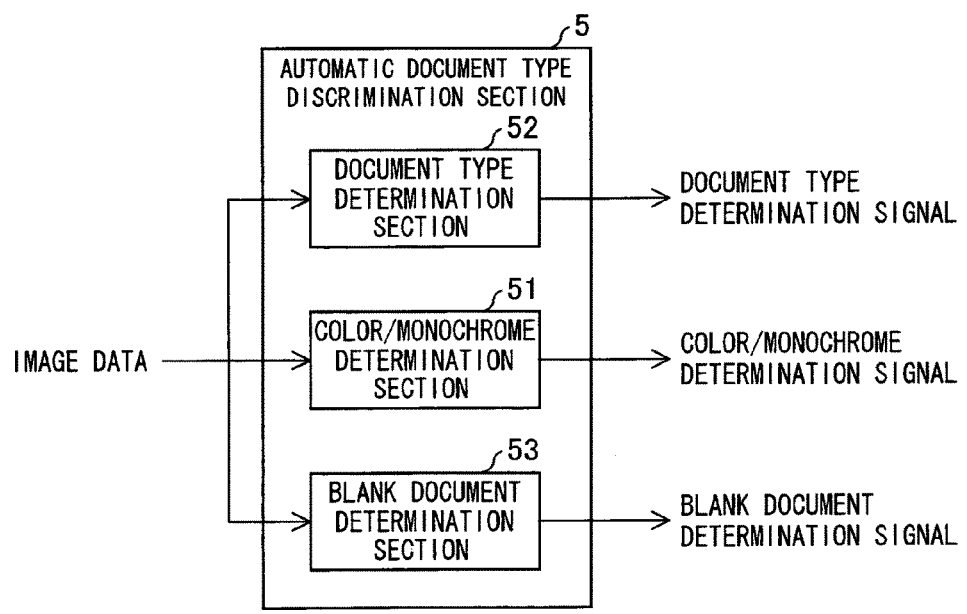

FIG. 3 is a block diagram showing an automatic document type discrimination section included in an image forming apparatus of the present embodiment.

Figure 4:
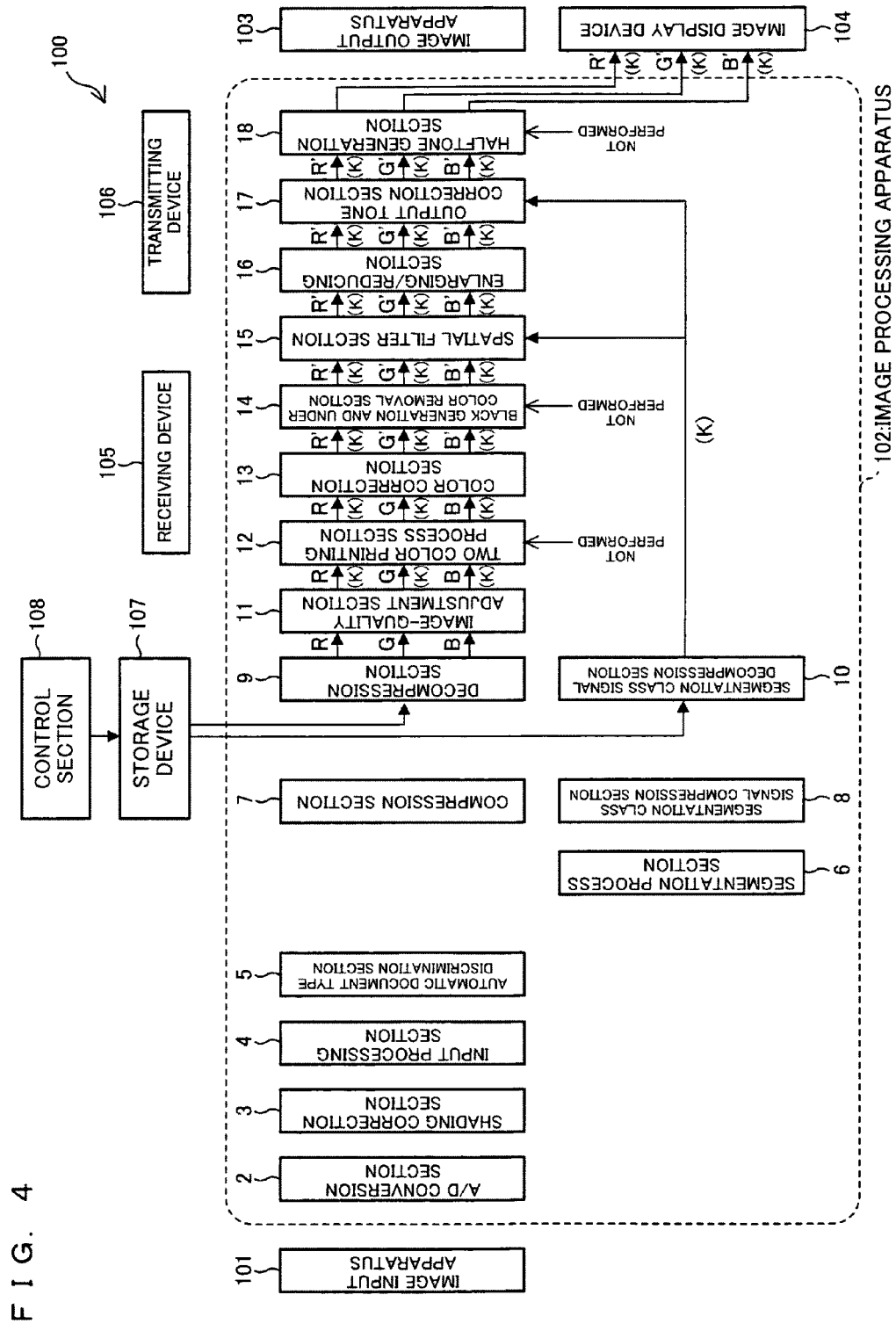

FIG. 4 is a block diagram showing the image forming apparatus of the present embodiment and shows a flow of an image data at a time when a re-preview display process is carried out in the copier mode and the full-color mode.

FIG. 5

(a) of FIG. 5 is a block diagram partially showing the image forming apparatus at a time when a re-preview display is carried out in the copier mode and the single-color mode. (b) of FIG. 5 is a block diagram partially showing the image forming apparatus at a time when the re-preview display is carried out in the copier mode and the two-color mode.

Figure 6:
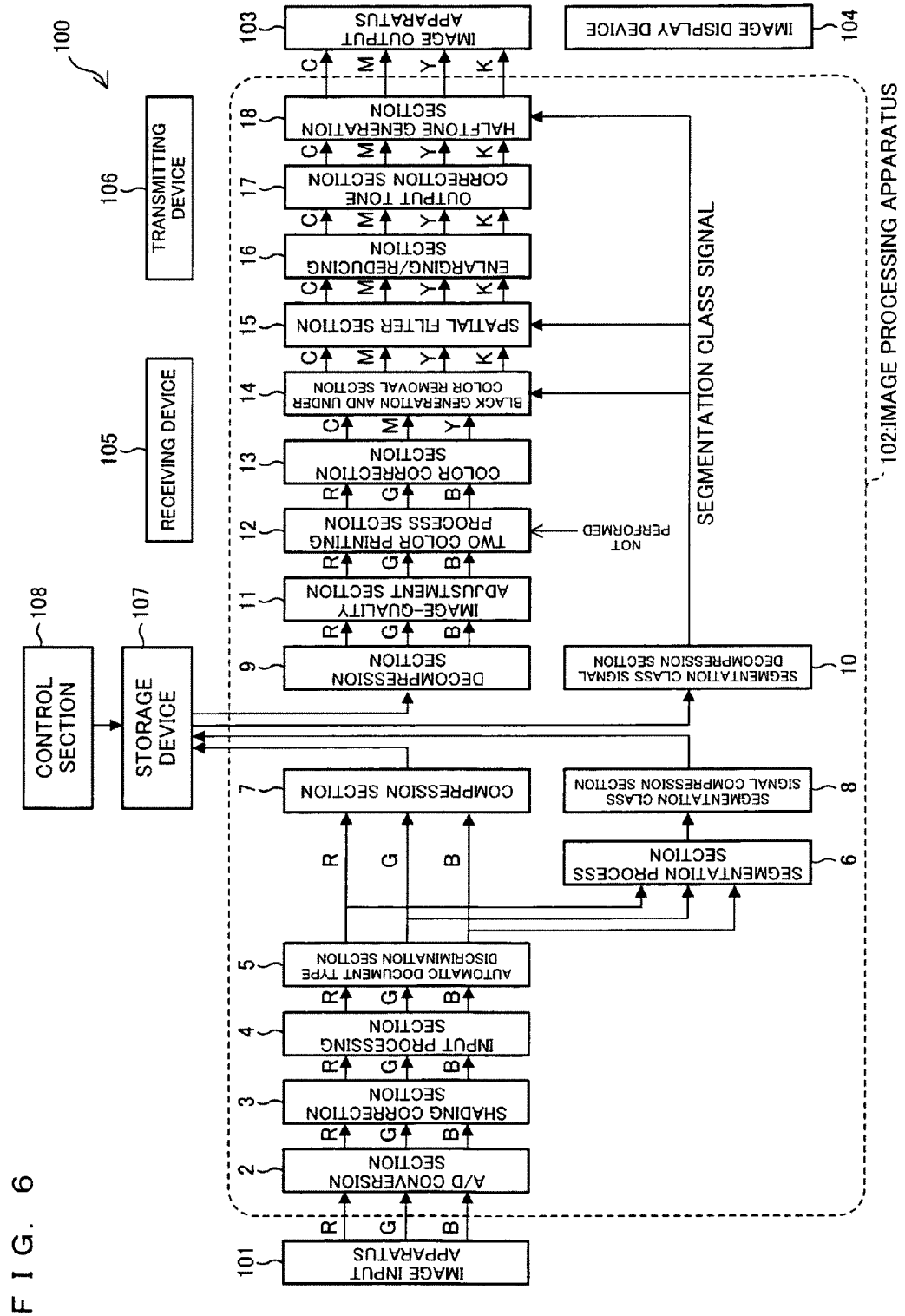

FIG. 6 is a block diagram showing the image forming apparatus of the present embodiment and shows a flow of image data at a time when a printing process is carried out in the copier mode and the full-color mode.

FIG. 7

Figure 7:
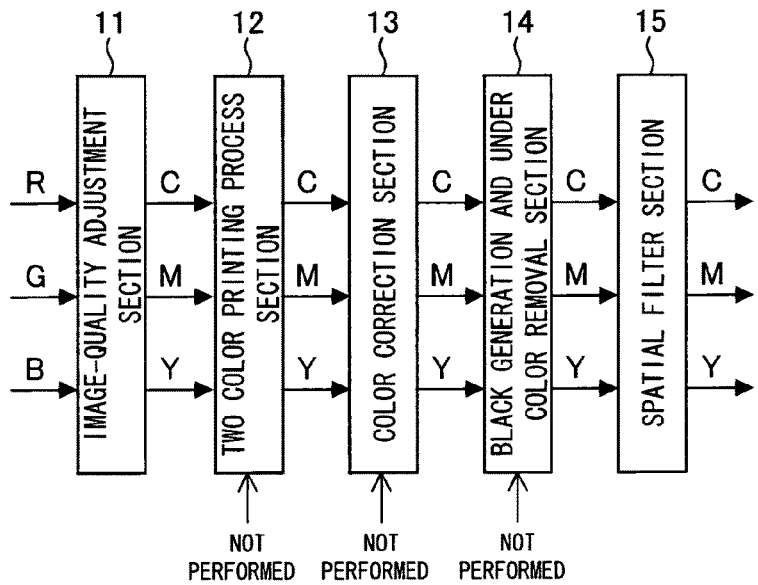
Figure 7:
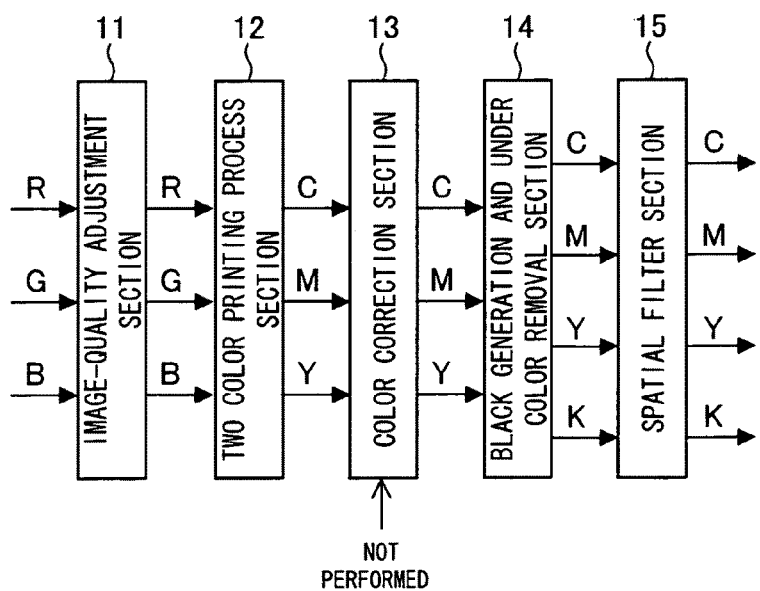

(a) of FIG. 7 is a block diagram partially illustrating the image processing apparatus at a time when the printing process is carried out in the copier mode and the single-color mode. (b) of FIG. 7 is a block diagram partially showing the image processing apparatus at a time when the printing process is carried out in the copier mode and the two-color mode.

FIG. 8

(a) of FIG. 8 shows an example of a gamma curve corresponding to display characteristics of an image display device. (b) of FIG. 8 shows a gamma curve, drawn in full line, for displaying a text sharply, and a gamma curve, drawn in dotted line, corresponding to the display characteristics of the image display device.

Figure 9:
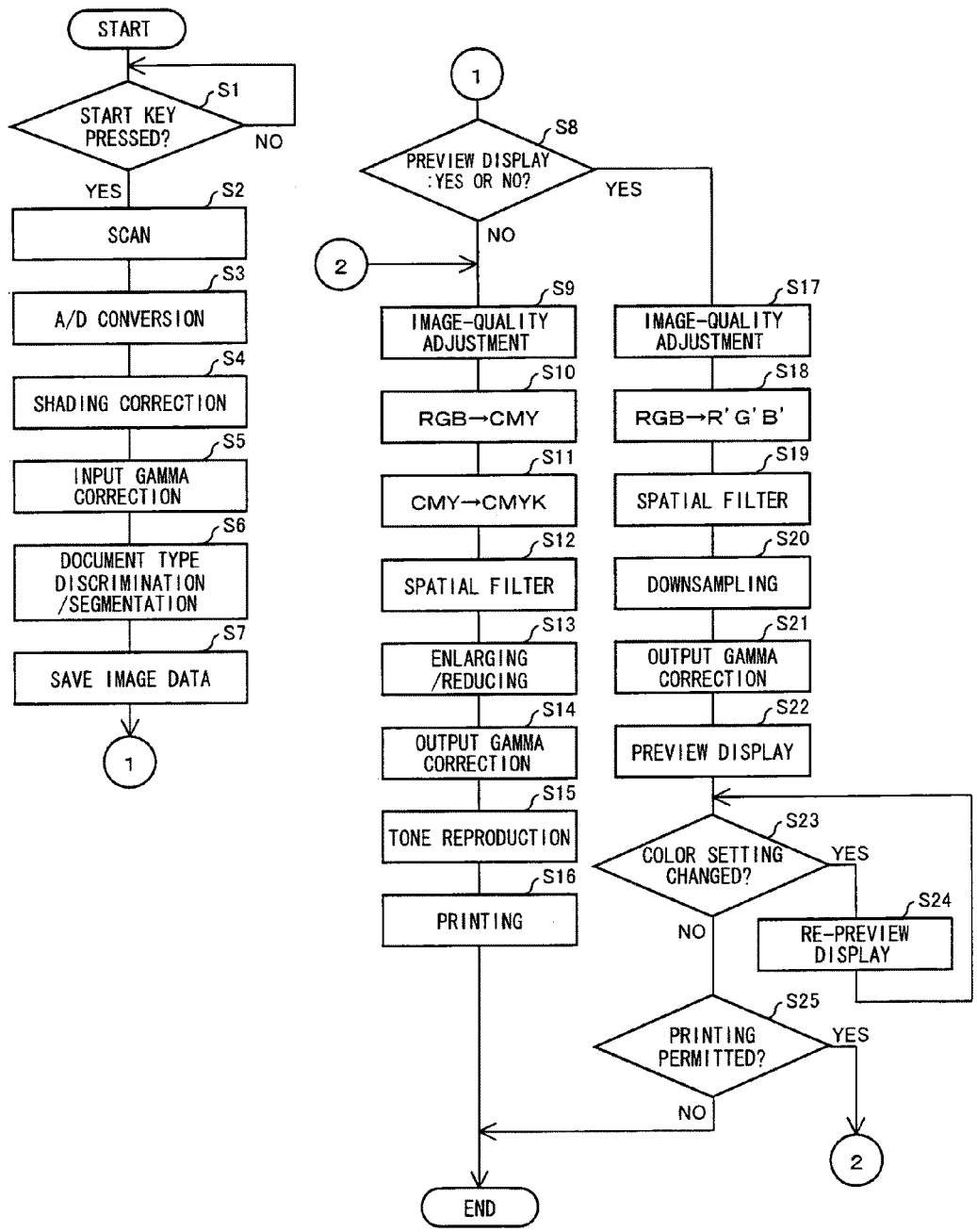

FIG. 9 is a flow charge showing a process procedure of the image forming apparatus in a case where the copier mode and the full-color mode are selected.

Figure 10:
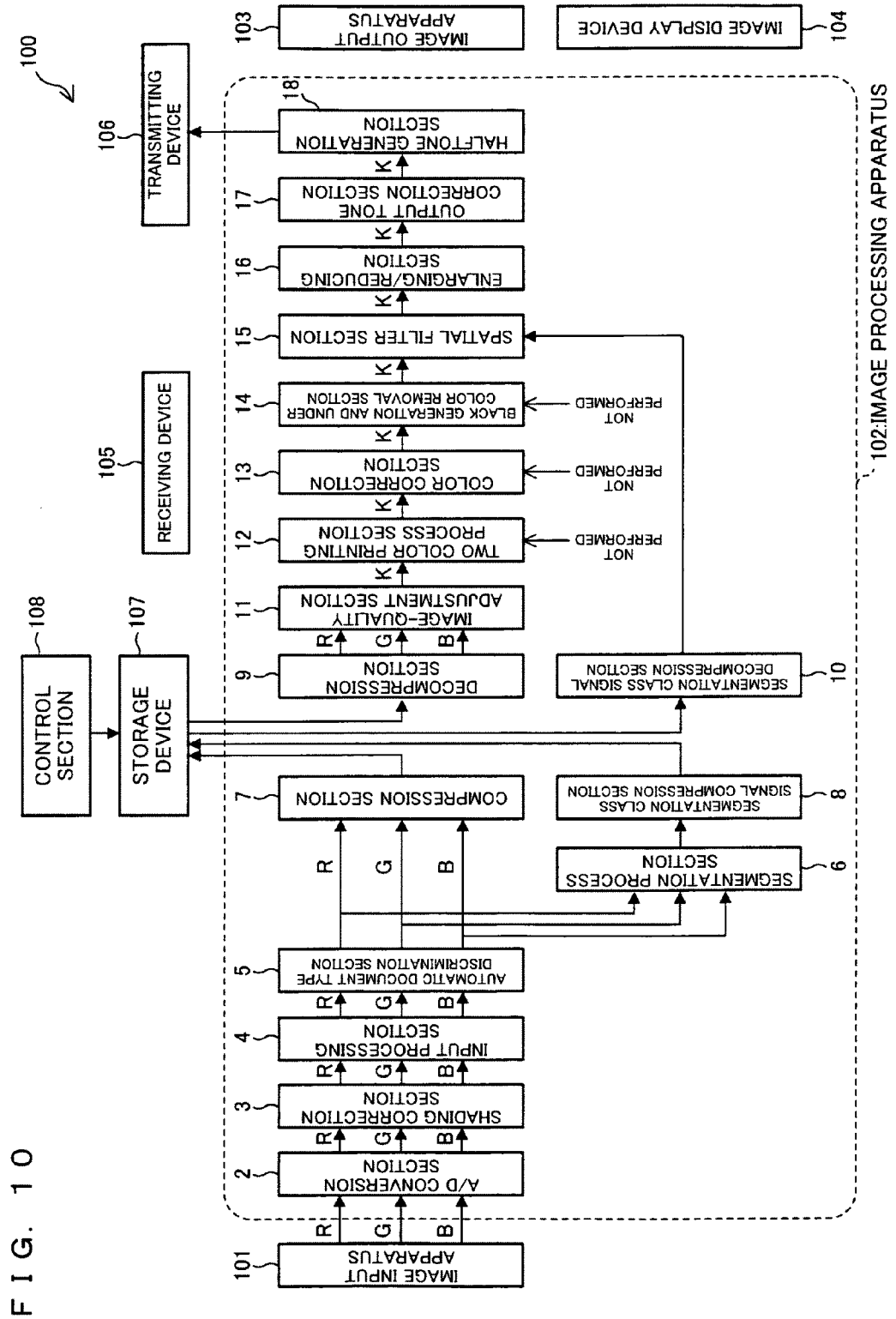

FIG. 10 is a block diagram showing the image forming apparatus of the present embodiment and shows a flow of image data at a time when a transmission process is carried out in a facsimile transmission mode.

Figure 11:
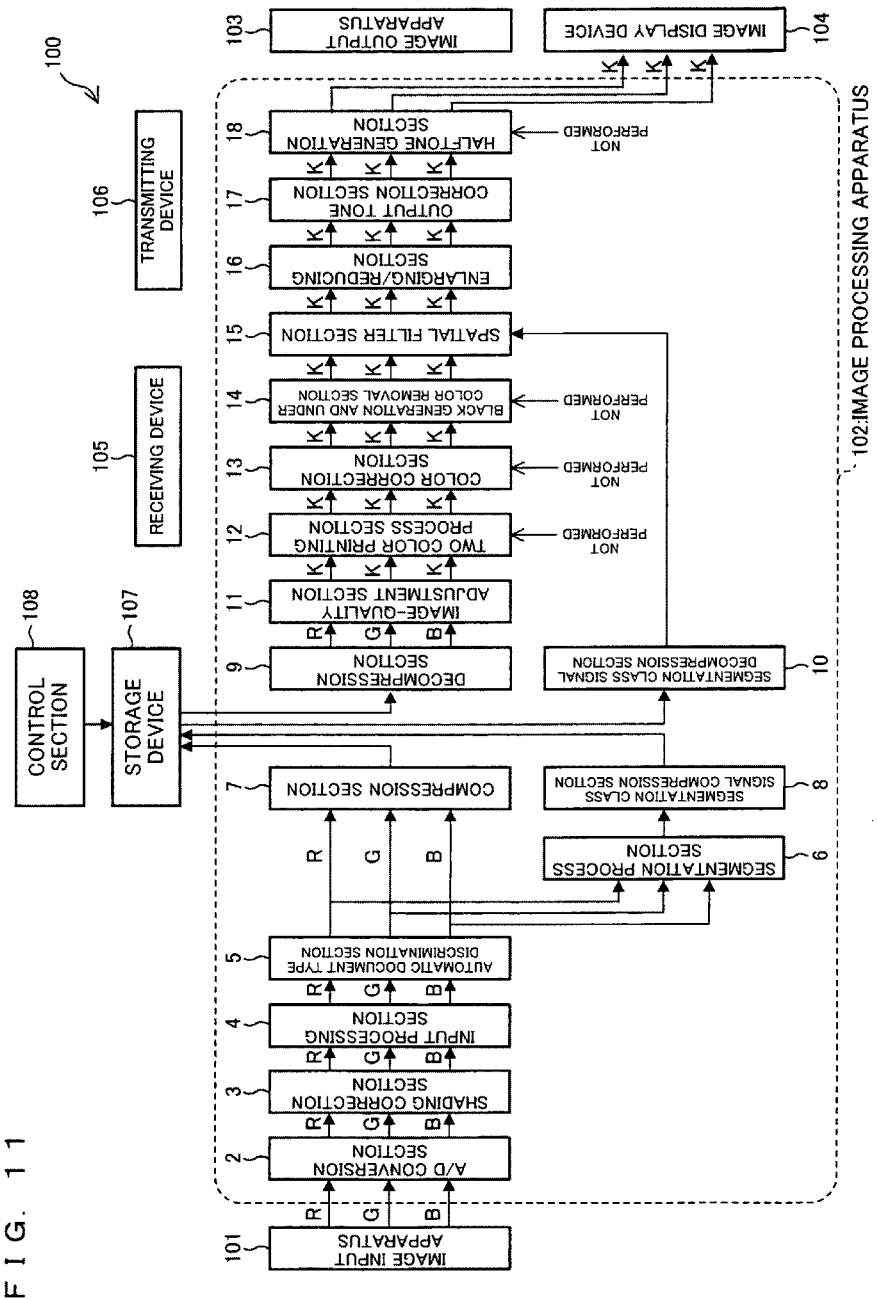

FIG. 11 is a block diagram showing the image forming apparatus of the present embodiment and shows a flow of image data at a time when the preview display process is carried out in the facsimile transmission mode.

Figure 12:
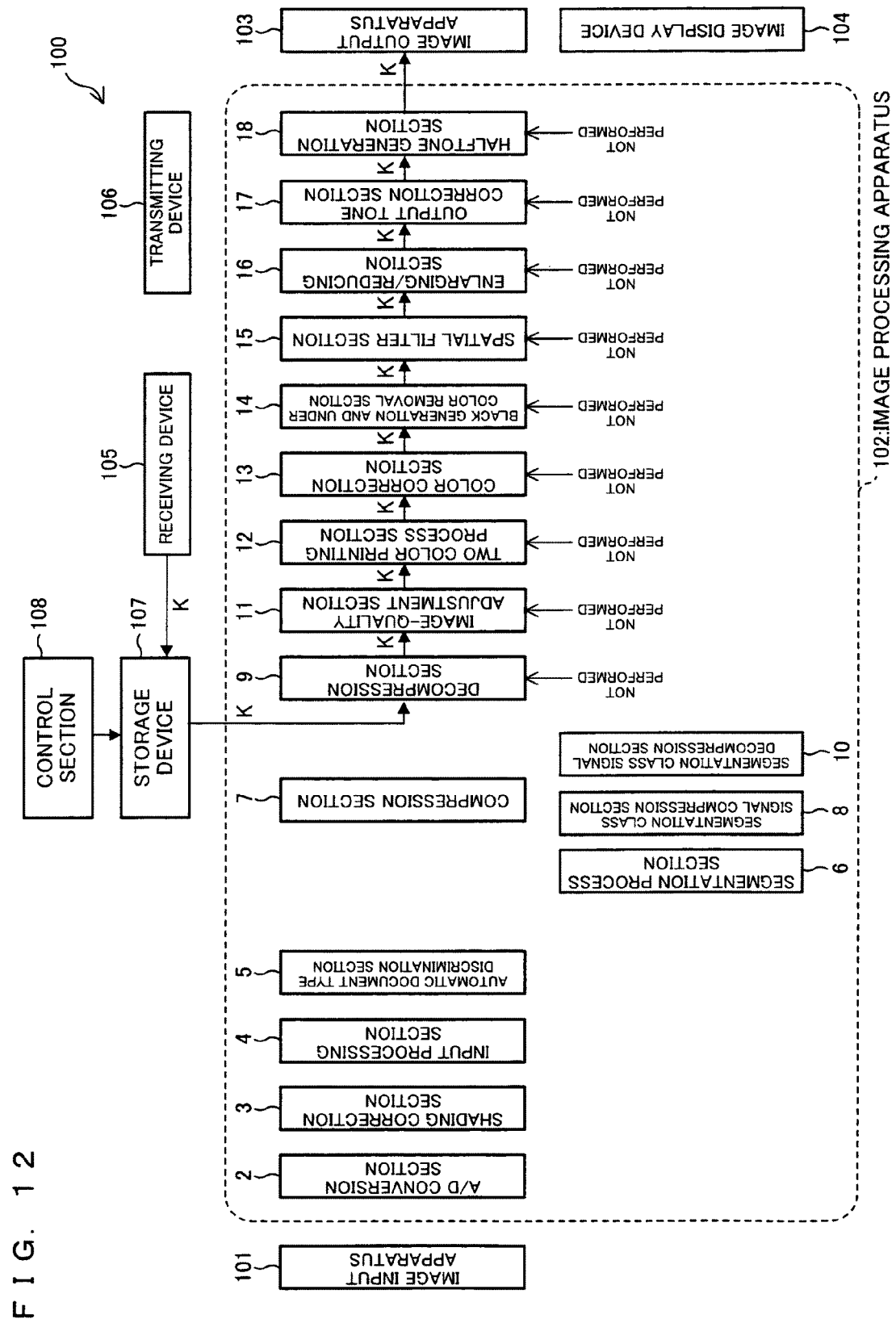

FIG. 12 is a block diagram showing the image forming apparatus of the present embodiment and shows a flow of image data at a time when the printing process is carried out in a facsimile reception mode.

Figure 13:
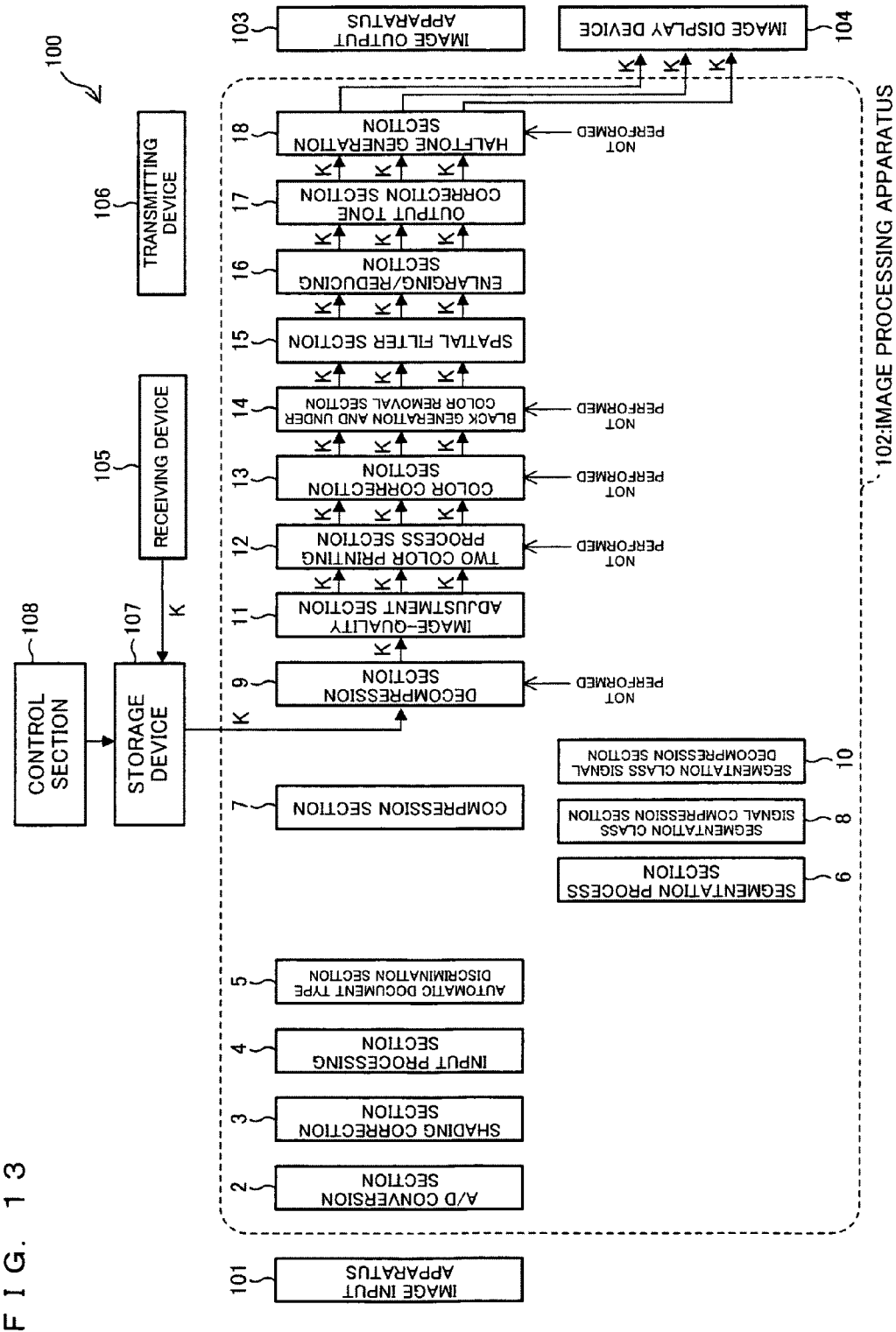

FIG. 13 is a block diagram showing the image forming apparatus of the present embodiment and shows a flow of image data at a time when the preview display process is carried out in the facsimile reception mode.

Figure 14:
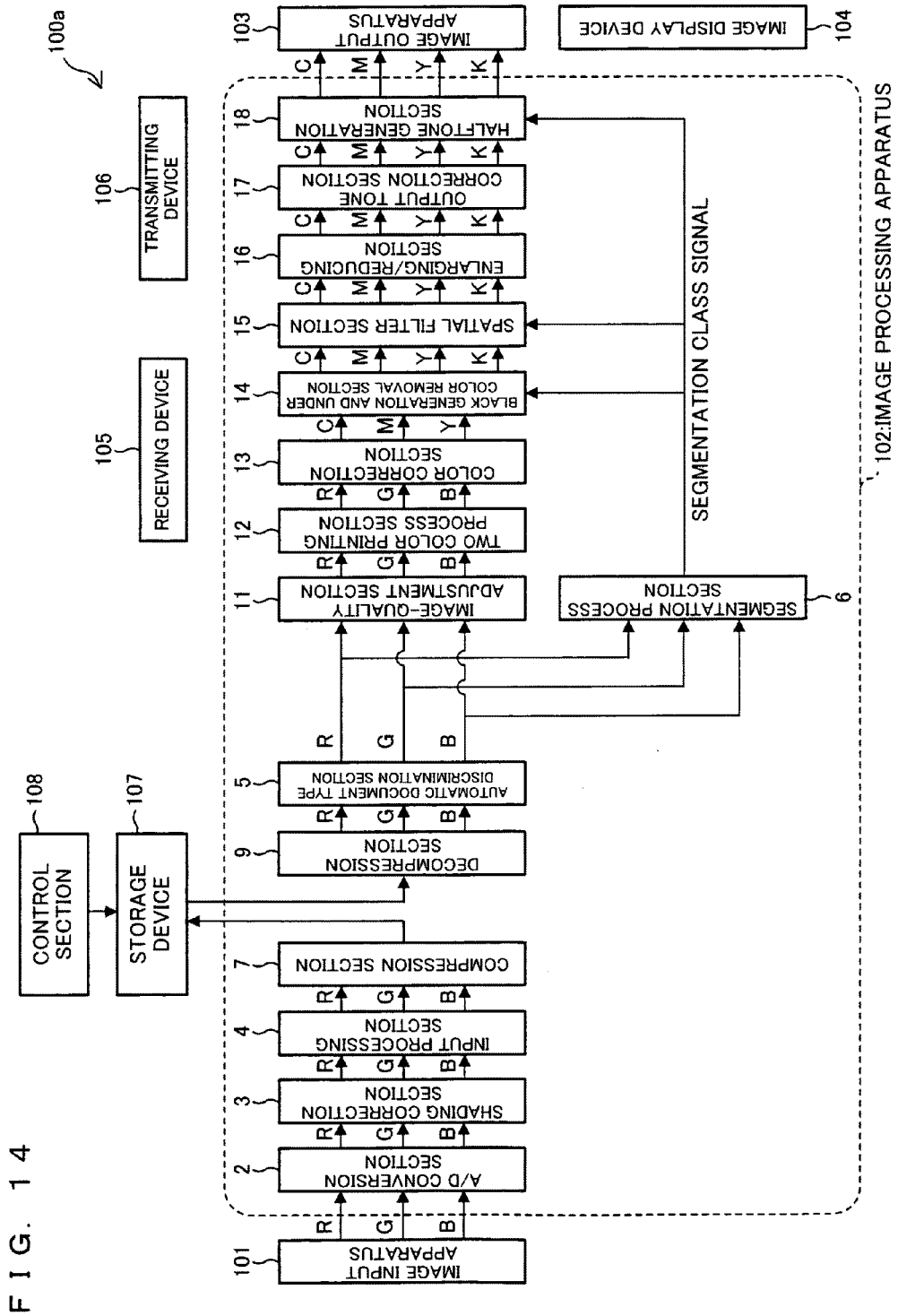

FIG. 14 is a block diagram showing a modified example of the image forming apparatus of the present embodiment.

Figure 15:
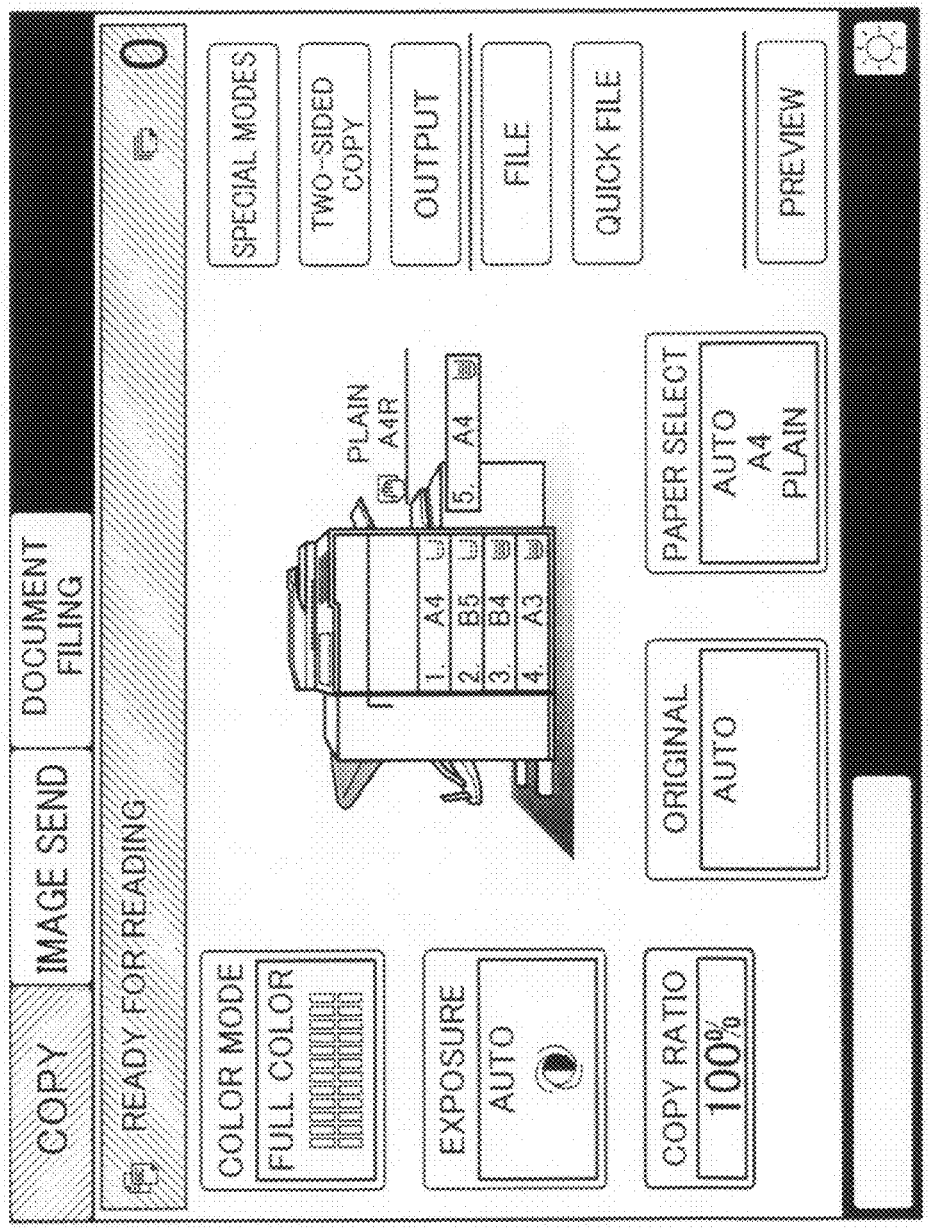

FIG. 15 shows a screen from which a preview display is designated in the copier mode.

Figure 16:
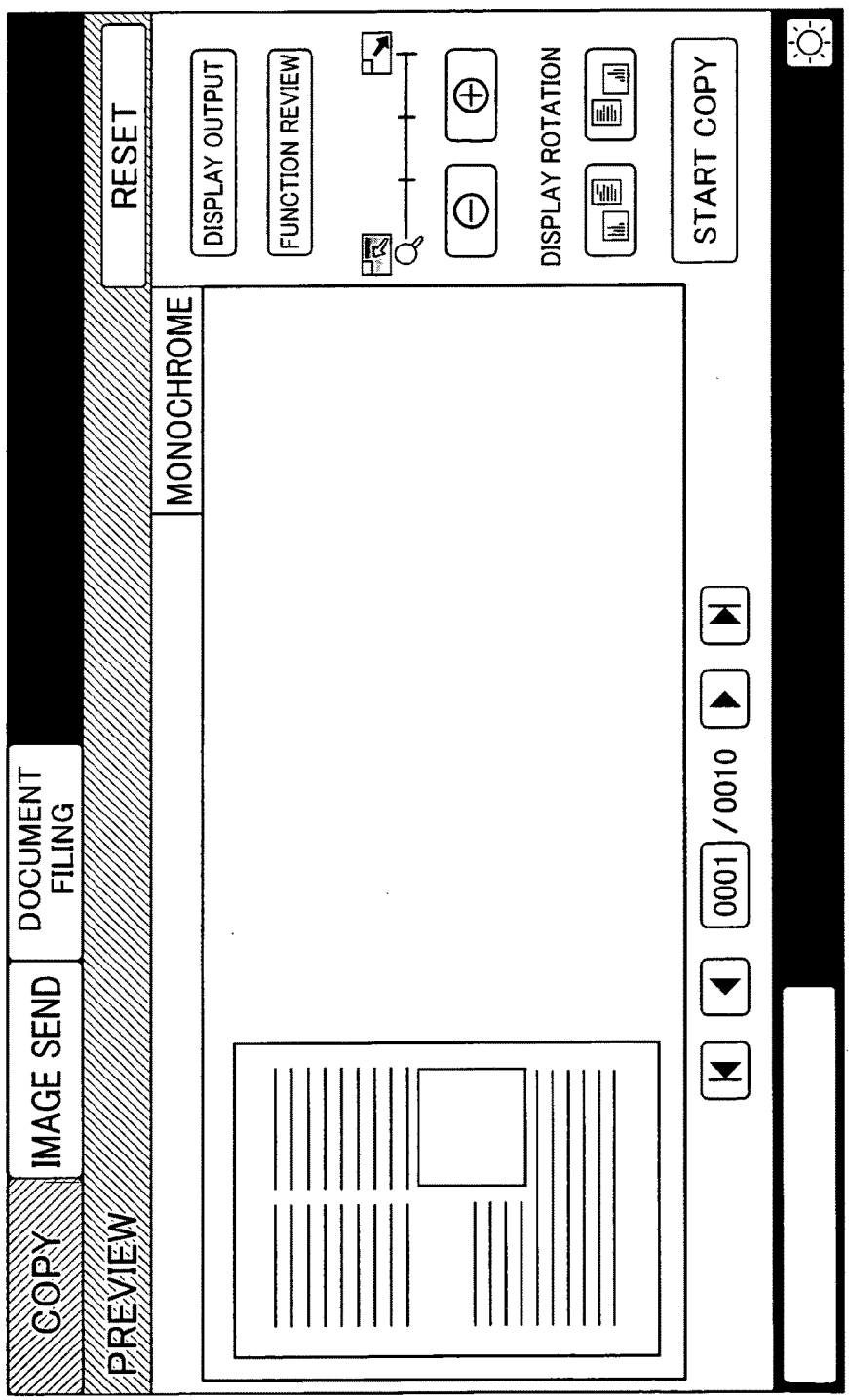

FIG. 16 shows an image displayed as a preview in the copier mode.

Figure 17:
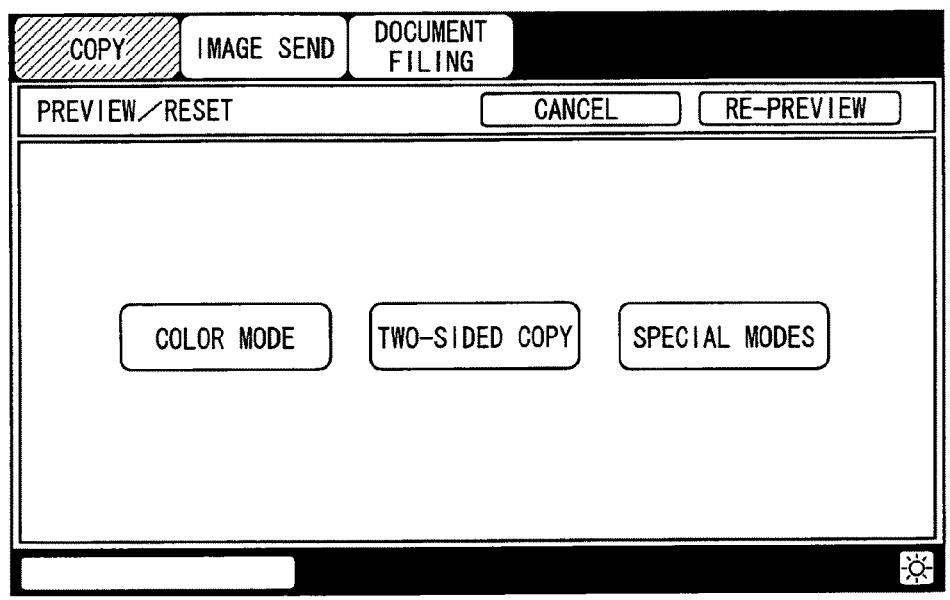

FIG. 17 shows a screen from which a setting item is selected from "color mode", "two-sided copy", and "special modes".

Figure 18:
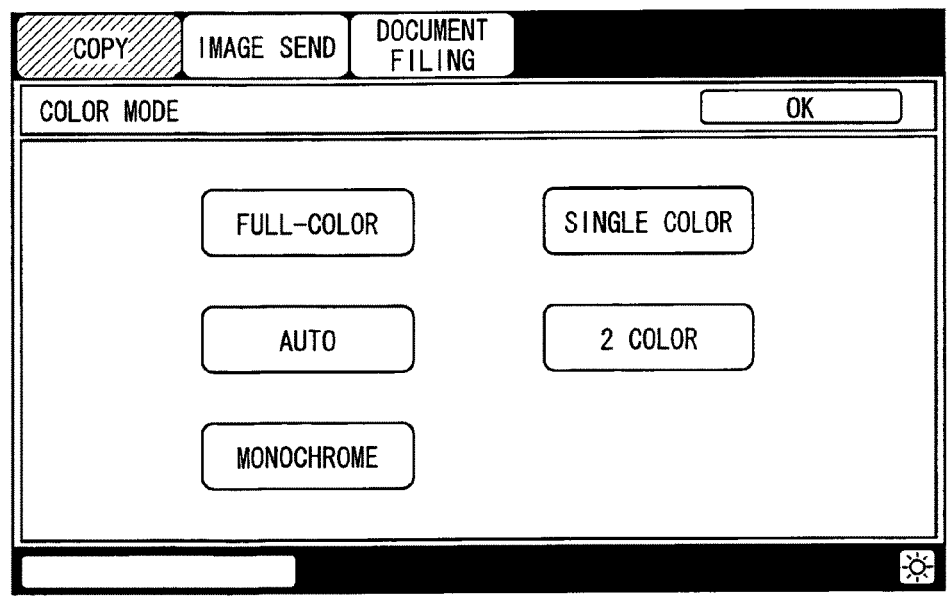

FIG. 18 shows a screen from which a settable mode is selected as a color setting in the copier mode.

Figure 19:
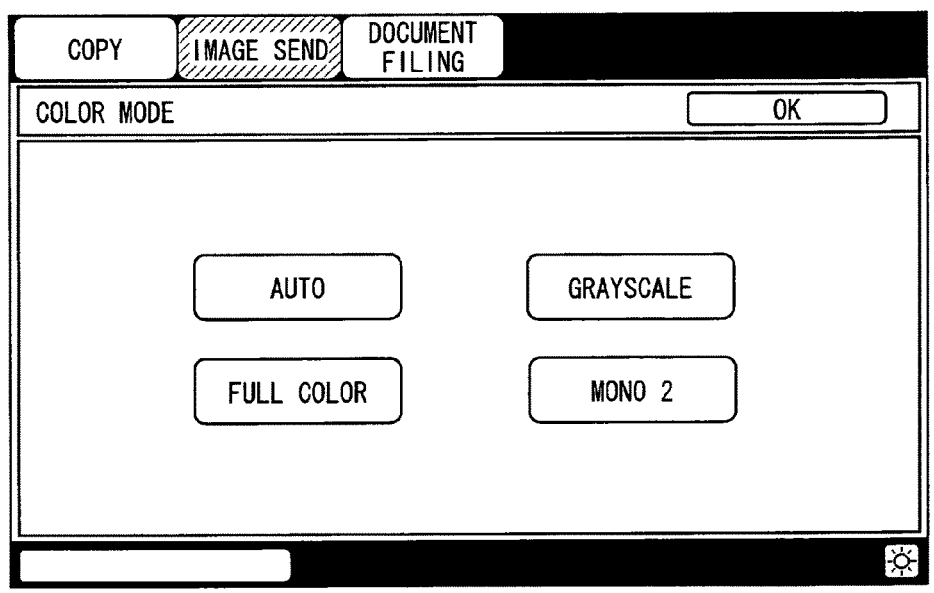

FIG. 19 shows a screen from which a settable mode is selected as a color setting in an image transmission mode.

Figure 20:
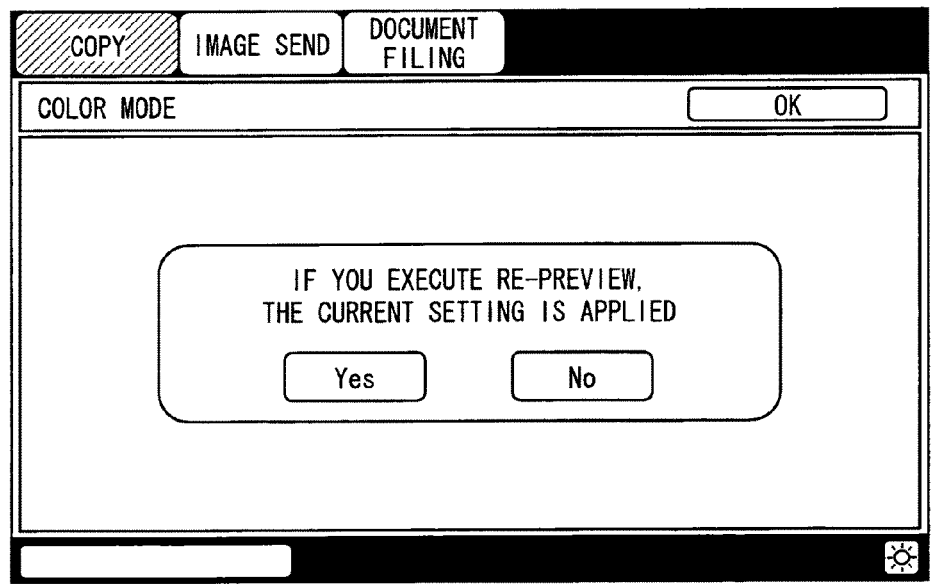

FIG. 20 shows a screen from which it is selected whether a re-preview is executed or not, in the copier mode.

Figure 21:
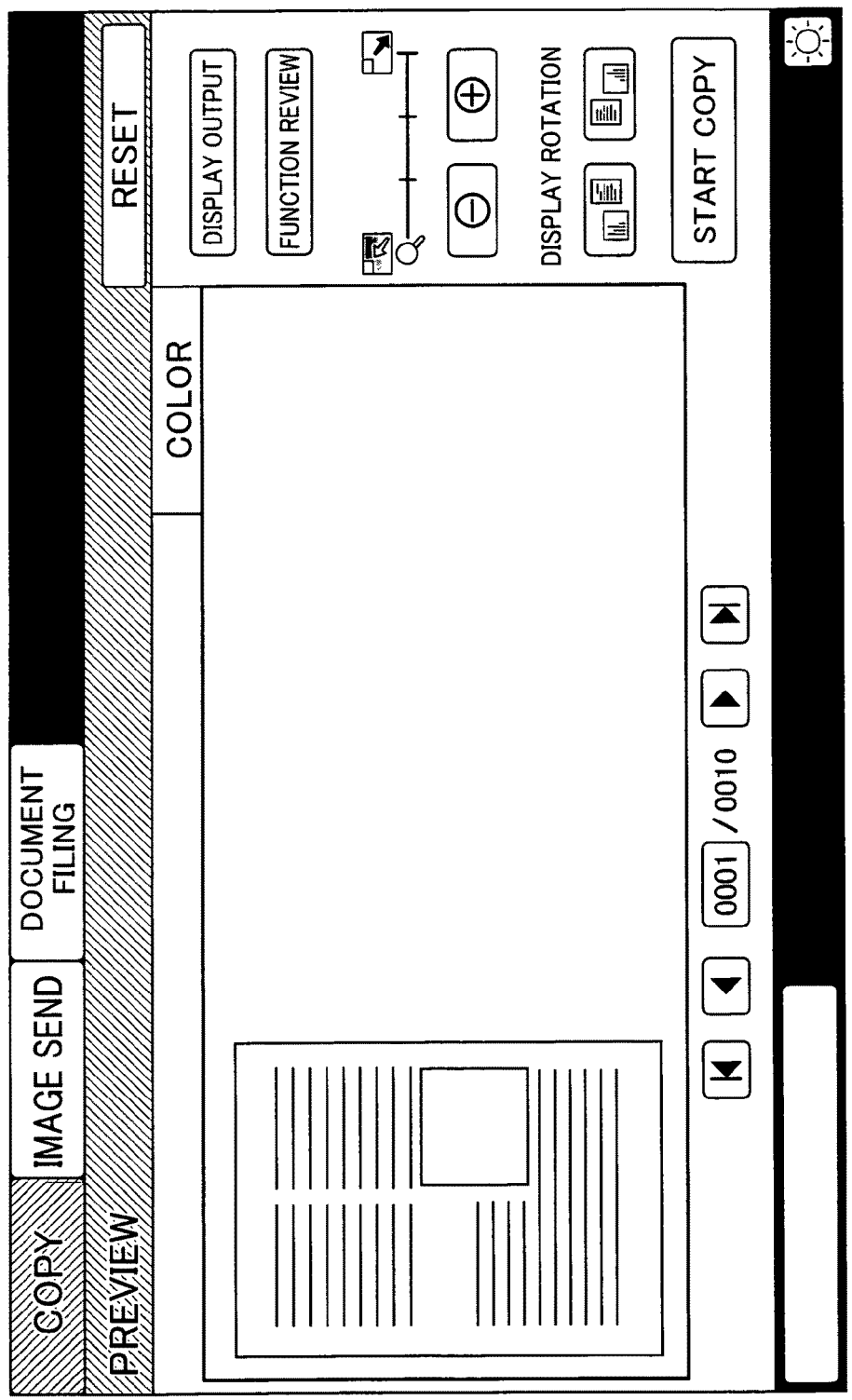

FIG. 21 shows an image displayed as a re-preview in the copier mode.

Figure 22:
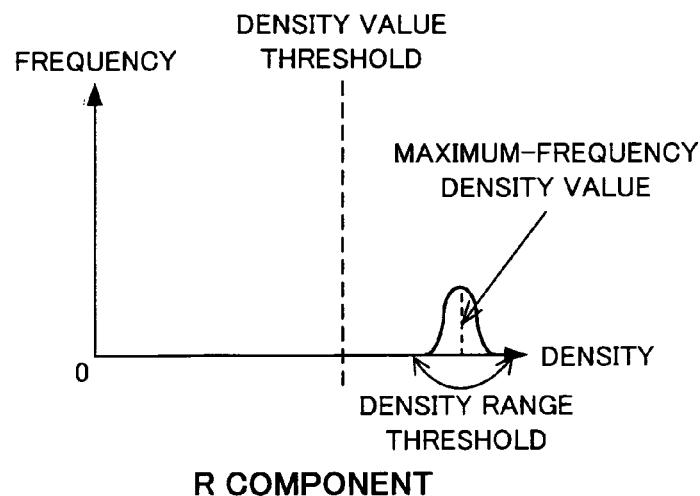
Figure 22:
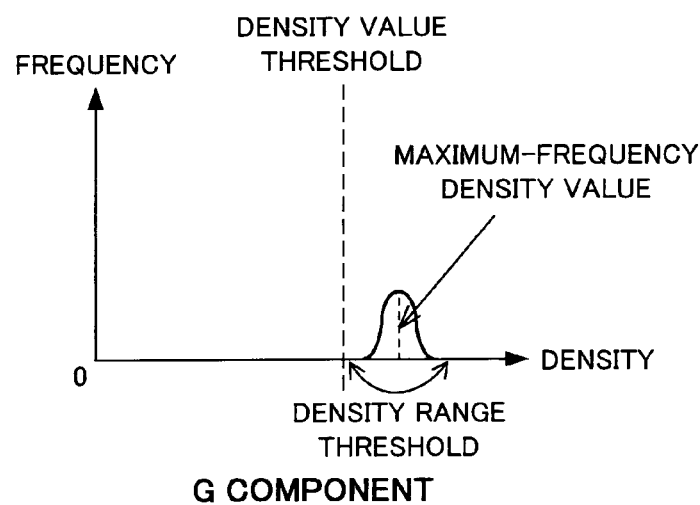
Figure 22:
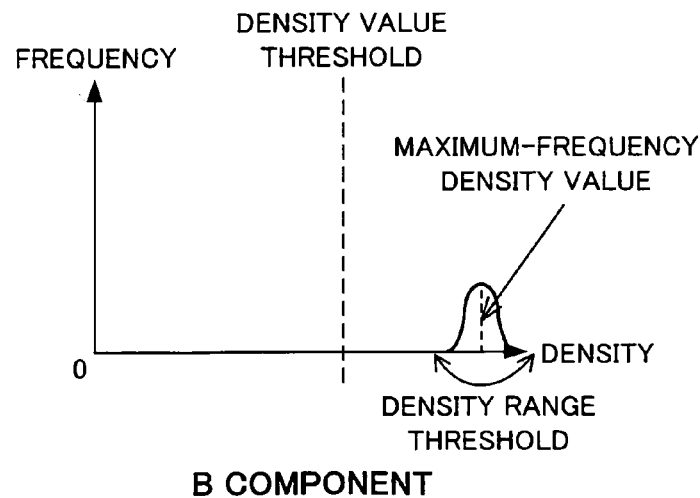

FIG. 22 shows exemplary a histogram of a partially-discolored document. (a) of FIG. 22 shows an R component, (b) of FIG. 22 shows a G component, and (c) of FIG. 22 shows a B component.

Figure 23:
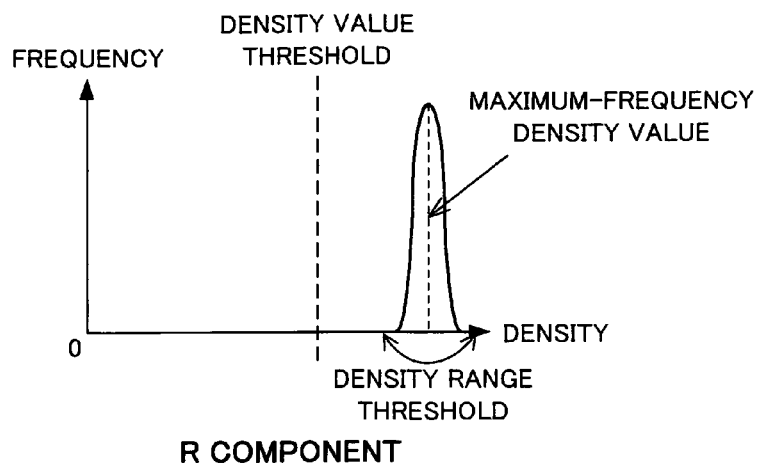
Figure 23:
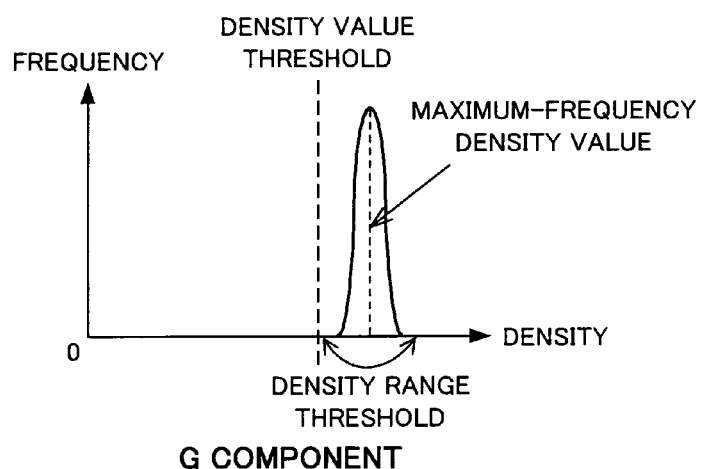
Figure 23:
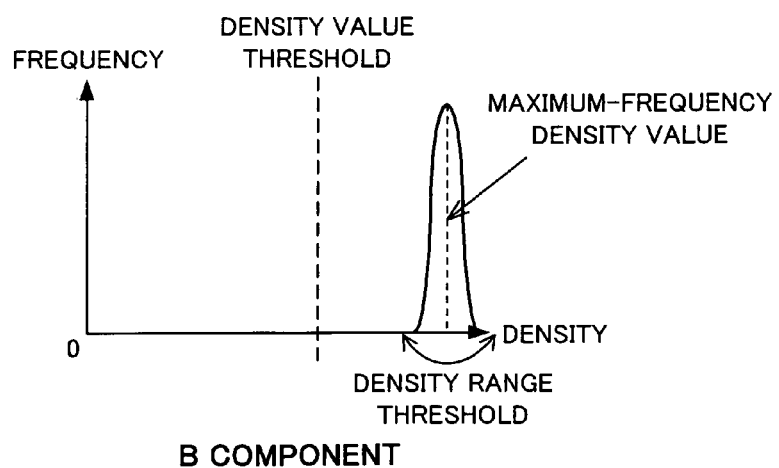

FIG. 23 shows exemplary a histogram of a document that is colored paper or wholly-discolored paper. (a) of FIG. 23 shows an R component, (b) of FIG. 23 shows a G component, and (c) of FIG. 23 shows a B component.

Figure 24:
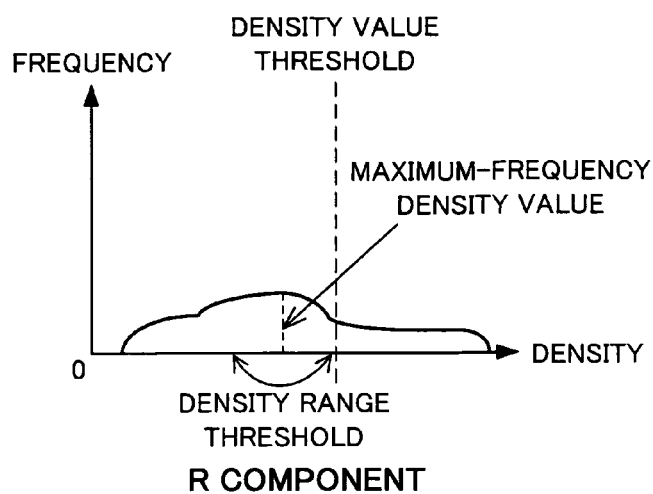
Figure 24:
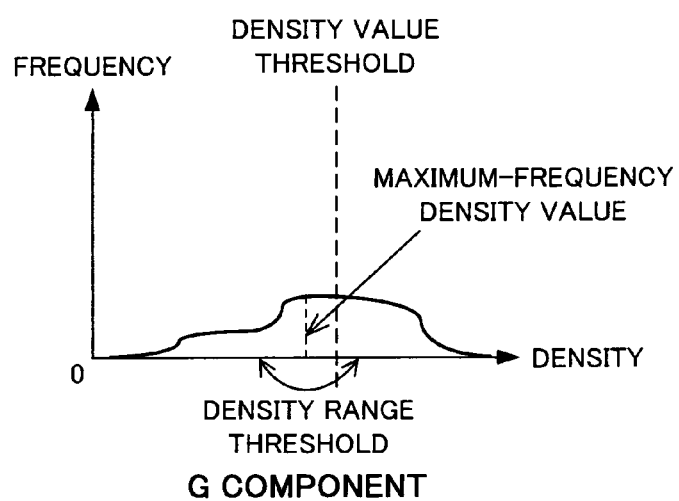
Figure 24:
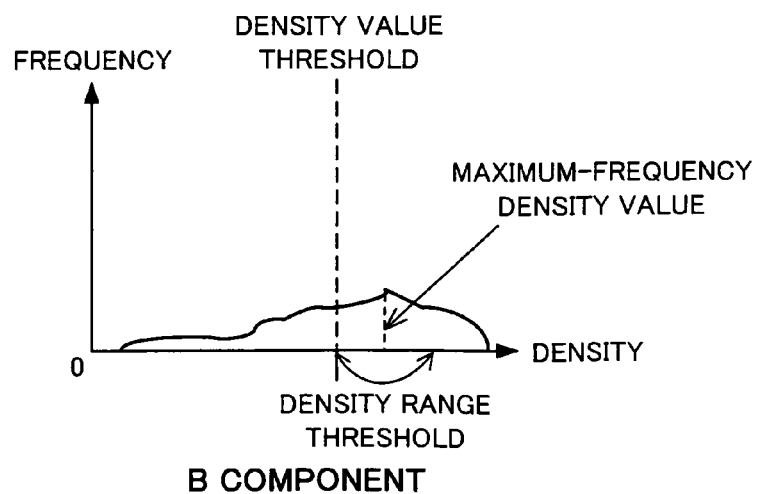

FIG. 24 shows exemplary a chromatic-pixel histogram of a general color document. (a) of FIG. 24 shows an R component, (b) of FIG. 24 shows a G component, and (c) of FIG. 24 shows a B component.

DESCRIPTION OF EMBODIMENTS

Figure 1:
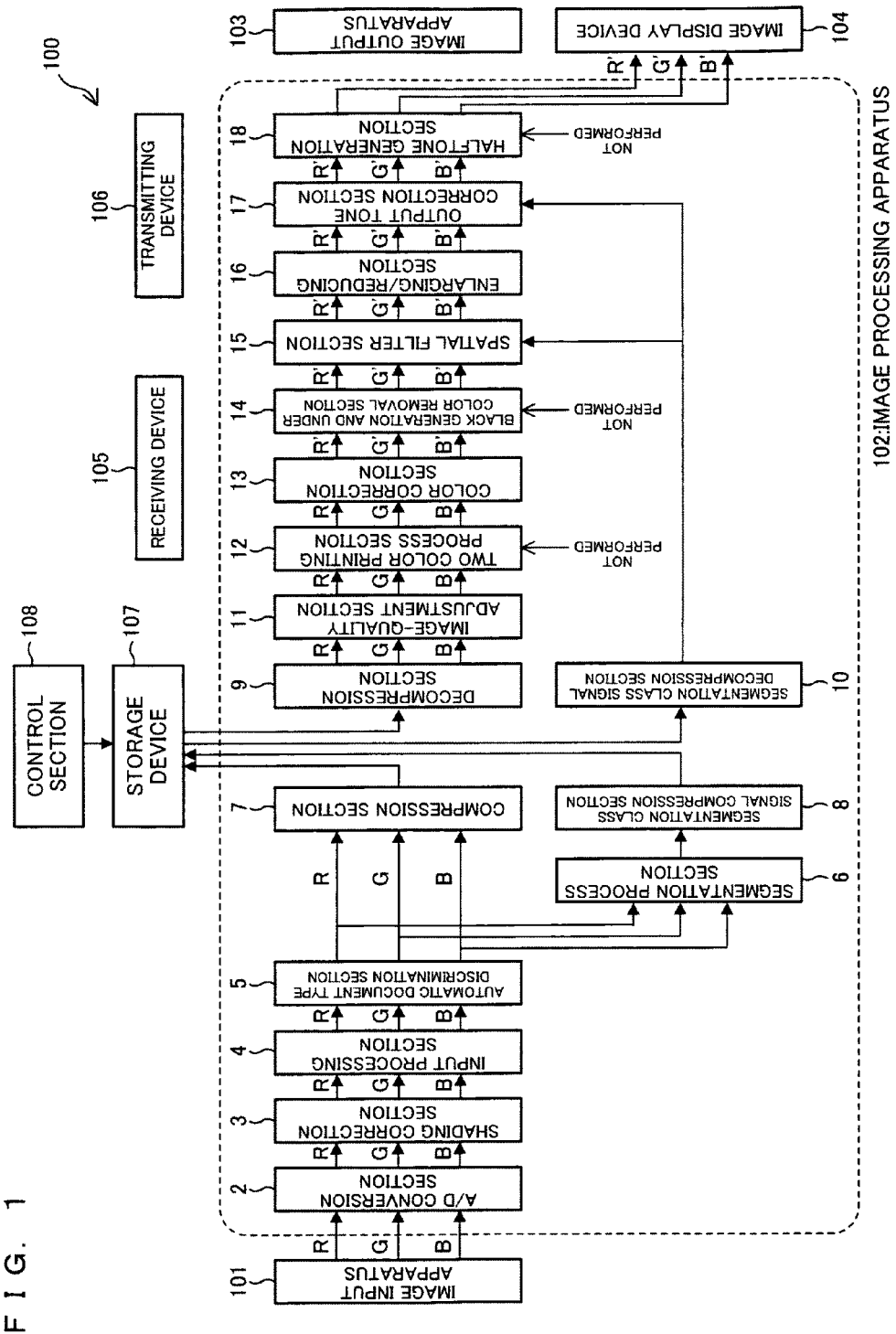
FIG. 1 is a block diagram showing an image forming apparatus of an embodiment and shows a flow of image data at a time when a preview display process is carried out in a copier mode and a full-color mode.

One embodiment of an image forming apparatus of the present invention is described below with reference to the attached drawings. FIG. 1 is a block diagram schematically showing an arrangement of an image forming apparatus 100 of the present embodiment.

The image forming apparatus 100 of the present embodiment is a digital color multifunction printer that executes a selected mode when any one of a copier mode, a print mode, a facsimile transmission mode, a facsimile reception mode, and an image transmission mode is selected.

The copier mode (copy mode) indicates a mode in which image data is read (image data is generated by reading out a document) and an image of the image data is printed on paper. Further, the print mode indicates a mode in which an image of image data transmitted from a terminal device connected to the image forming apparatus 100 is printed on paper. The facsimile transmission mode indicates: (i) a general facsimile mode in which image data obtained by reading a document is transmitted to an external apparatus via telephone lines; and (ii) an Internet facsimile mode in which the image data is attached to a mail and transmitted via the Internet. The facsimile reception mode indicates a mode in which image data is received by facsimile from an external apparatus and an image of the image data thus received is printed on paper. The image transmission mode indicates: (1) a mode (scan to e-mail mode) in which image data generated by reading a document is attached to an electronic mail and transmitted to a designated address; (2) a mode (scan to ftp mode) in which image data generated by reading a document is transmitted to a folder designated by a user; and (3) a mode (scan to usb mode) in which image data generated by reading a document is transmitted to a USB memory or the like attached to the image forming apparatus 100. In the present embodiment, the facsimile transmission mode and the image transmission mode are classified as above, in view of how to operate image processing.

Further, the user can select, as a color setting, any one of a monochrome mode in which a monochrome image is outputted, a full-color mode in which a full-color image is outputted, a single-color mode in which a single-color image colored by a single color that the user desires is outputted, and a two-color mode in which a two-color image colored by black and another color that the user desires.

For example, in a case where the user selects the single-color mode in the copier mode or the print mode, such a single-color image is printed. Further, in a case where the user selects the two-color mode in the copier mode or the print mode, image data of such a two-color image is printed. In the single-color mode or the two-color mode, the user selects one desired color from R (red), G (green), B (blue), C (cyan), M (magenta), and Y (yellow).

Further, in the present embodiment, it is also possible to set an auto color selection mode. In a case where the auto color selection mode is set, the image forming apparatus 100 carries out an automatic color discrimination (auto color selection: ACS) process of determining whether a target document to be copied is a color document or a monochrome document. In a case where the target document is determined as a color document, the image forming apparatus 100 carries out output processing in the full-color mode. In a case where the target document is determined as a monochrome document, the image forming apparatus 100 carried out the output processing in the monochrome mode.

As shown in FIG. 1, the image forming apparatus 100 includes an image input apparatus 101 (an image reading apparatus), an image processing apparatus 102, an image output apparatus 103 (a job apparatus), an image display device 104, a receiving device 105, a transmitting device 106 (a job apparatus), a storage device 107, and a control section 108 (storing means, change instruction receiving means).

The image input apparatus 101 is image reading means for reading a document and for generating image data, in the copier mode, the facsimile transmission mode, or the image transmission mode. More specifically, the image input apparatus 101 includes a scanner section having a CCD (Charge Coupled Device) so that the image input apparatus 101 converts light reflected from the document into electrical signals (analogue image signals) decomposed into color signals of RGB and supplies the electrical signals to the image processing apparatus 102.

Even in a case where any of the full-color mode, the single-color mode, and the two-color mode is selected, the image input apparatus 101 reads out a document image in full color. Further, even in a case where the aforementioned automatic color discrimination process is carried out in the image processing apparatus 102, the image input apparatus 101 reads out the document image in full color.

The image processing apparatus 102 is an integrated circuit that carries out image processing with respect to image data (image signals), and is constituted by an ASIC (Application Specific Integrated Circuit). As shown in FIG. 1, the image processing apparatus 102 includes an A/D (analogue/digital) conversion section 2, a shading correction section 3, an input processing section 4, an automatic document type discrimination section 5, a segmentation process section 6, a compression section 7, a segmentation class signal compression section 8, a decompression section 9, a segmentation class signal decompression section 10, an image-quality adjustment section 11, a two color printing process section 12, a color correction section 13, a black generation and under color removal section 14, a spatial filter section 15, an enlarging/reducing (zoom process) section 16, an output tone correction section 17, and a halftone generation section 18. What kind of process is carried out in each block included in the image processing apparatus 102 will be described later.

The image processing apparatus 102 carries out image processing with respect to image data transmitted from the image input apparatus 101 in the copier mode, the facsimile mode, or the image transmission mode. The image processing apparatus 102 also carries out image processing with respect to image data transmitted from the terminal device in the print mode. Further, the image processing apparatus carries out image processing with respect to image data received from the external apparatus in the facsimile reception. The image processing apparatus 102 transmits, to the image output apparatus 103, the image data subjected to the image processing, in the copier mode, the print mode, or the facsimile reception mode. Further, the image processing apparatus 102 transmits, to the transmitting device 106, the image data subjected to the image processing, in the facsimile transmission mode. Furthermore, in the scan to e-mail mode as the image transmission mode, the image processing apparatus 102 transmits the image data subjected to the image processing, to an mail processing section (not shown). In the scan to ftp mode as the image transmission mode, the image processing apparatus 102 transmits the image data subjected to the image processing, to a predetermined folder. Moreover, in the scan to usb mode as the image transmission mode, the image processing apparatus 102 transmits the image data subjected to the image processing, to a predetermined USB memory.

The image output apparatus (printer) 103 prints (forms) an image of the image data transmitted from the image processing apparatus 102 on a recording medium (such as paper). The image output apparatus 103 may be, for example, a color printer employing an electrophotographic printing method or a color printer employing an inkjet method. The "printing" in the present embodiment indicates any one of printing in the print mode, printing in the copier mode, and printing in the facsimile reception mode.

The image display device 104 is a liquid crystal display included in an operation panel (not shown) of the image forming apparatus 100, and display means capable of displaying a color image. Further, the image display device 104 is covered with a touch panel and has a function as an input interface of the image forming apparatus 100. That is, the image display device 104 displays a GUI (graphical user interface) for inputting various commands to the image forming apparatus 100 and an operation guide.

Further, in the image forming apparatus 100 of the present embodiment, in the copier mode or the facsimile reception mode, it is possible to display a preview of a target image to be printed on the image display device 104 before the target image is printed. Moreover, in the image forming apparatus 100 of the present embodiment, in the facsimile transmission mode or the image transmission mode, it is possible to display a preview of a target image to be transmitted on the image display device 104 before the target image is transmitted.

Further, in the copier mode or the image transmission mode, a preview of a full-color image is displayed in a case where the full-color mode is selected, a preview of a single-color image is displayed in a case where the single-color mode is selected, and a preview of a two-color image is displayed in a case where the two-color mode is selected.

The image display device 104 is not limited to the liquid crystal display, and may be display means other than the liquid crystal display (for example, an organic EL display, a plasma display, or the like).

The receiving device 105 is connected to telephone lines or the Internet and receives image data from the external apparatus via facsimile communications. Further, the transmitting device 106 is connected to telephone lines or the Internet and transmits, to the external apparatus, image data inputted in the image input apparatus 101 via facsimile communications.

The storage device 107 is a hard disk in which image data processed in the image processing apparatus 102 is temporarily stored.

The control section 108 is a computer including a processor such as a CPU (Central Processing Unit) or a DSP (Digital Signal Processor) and controls various pieces of hardware included in the image forming apparatus 100 overall. Further, the control section 108 has a function of controlling data transmission between the various pieces of hardware included in the image forming apparatus 100. In FIG. 1, the control section 108 is provided as an external section of the image processing apparatus 102, but may be provided in the image forming apparatus 102.

In the image forming apparatus 100 of the present embodiment, the control section 108 receives, from the user, a job execution instruction of which mode is executed (the copier mode, the facsimile transmission mode, the facsimile reception mode, or the image transmission mode) and starts processing in accordance with the job execution instruction. Further, when receiving the job execution instruction of the copier mode, the facsimile transmission mode, or the image transmission mode, the control section 108 also receives an input of a color setting with respect to an image to be outputted. As mentioned above, there are a monochrome mode, a full-color mode, a single-color mode, a two-color mode, and an auto color selection mode as the color setting.

In the image forming apparatus 100 of the present embodiment, even after having received the job execution instruction, the control section 108 can receive a change instruction to change the color setting initially received with the job execution instruction. This arrangement allows the user to change the color setting in such cases where (i) after a document has been read out, the user finds that the document includes a few color pages mixed with many black-and-white pages and wants to print that few color pages in the full-color mode, and (ii) after a document has been read out, the use checks a preview of an image and wants to change the color setting.

In view of this, the image processing apparatus 102 carries out the automatic color discrimination (ACS) process with respect to image data read by the image input apparatus 101, regardless of which color setting has been received together with the job execution instruction, and stores a determination result of whether the document is a color document or a monochrome document, in the storage device 107 so that the determination result are correlated with the image data. In a case where the control section 108 receives the change instruction to change the color setting, the control section 108 controls the image processing apparatus 102 so that the image processing apparatus 102 generates image data for job execution from the image data and the determination result each stored in the storage device 107, following a changed color setting.

The following describes what process is carried out in each of the blocks of the image processing apparatus 102 in each of the copier mode, the facsimile transmission mode, the facsimile reception mode, and the image transmission mode. The image processing apparatus 102 of the present embodiment includes a block that operates while a certain mode a is selected but does not operate while another mode b, different from the certain mode a, is selected (each of the mode a and the mode b is any one of the copier mode, the facsimile transmission mode, the facsimile reception mode, and the image transmission mode). Further, the image processing apparatus 102 includes a block that changes what process to be carried out, in accordance with a selected mode. Moreover, the image processing apparatus 102 includes a block that operates while image data for printing (transmission) is processed but does not operate while image data for a preview is processed, even in the same mode being selected. Furthermore, the image processing apparatus 102 includes a block that changes what process to be carried out between during processing image data for printing (transmission) and during processing image data for a preview. Each process carried out in each of the blocks included in the image processing apparatus 102 is explained in accordance with each mode, in a case of a printing process (transmission process) and in a case of a preview display, separately.

(1) Copier Mode (1-1) Preview Display

The following explains about the image processing apparatus 102 with reference to FIG. 1. FIG. 1 shows a flow of image data in the image processing apparatus 102 at a time when a preview display process is carried out in the copier mode and the full-color mode.

The A/D (analogue/digital) conversion section 2 is a block for converting color image signals (RGB analogue signals) transmitted from the image input apparatus 101 into digital image data (RGB digital signals). The shading correction section 3 is a block for removing various distortions produced in an illumination system, an image focusing system, and an image sensing system of the image input apparatus 101 from the image data transmitted from the A/D conversion section 2. The input processing section 4 is a block for carrying out a tone conversion process, such as a gamma correction process, with respect to respective RGB image data transmitted from the shading correction section 3.

The automatic document type discrimination section includes, as shown in FIG. 3, a color/monochrome determination section (color/monochrome determination means) 51, a document type determination section 52, and a blank document determination section 53, and determines a type of a document read out by the image input apparatus 101, on the basis of the RGB image data (RGB density signals) subjected to the gamma correction or the like process in the input processing section 4. More specifically, the color/monochrome determination section 51 carries out an automatic color discrimination process (ACS: Auto Color Selection) of determining whether the read out document is a color document or a monochrome document based on the image data. A determination result of the automatic color discrimination process is supplied to the compression section 7 as a color/monochrome determination signal.

In a case where the read out document includes a plurality of pages, the color/monochrome determination section 51 determines whether image data of an image on each of the plurality of pages is color or monochrome and outputs a determination result for the each of the plurality of pages.

Further, the document type determination section 52 carries out a document type discrimination process of determining, based on the image data, whether the read out document is a text document, a printed-picture document, a text/printed-picture document that includes a text and a printed-picture, a photographic-picture document, or a text/photographic-picture document. A determination result of the document type discrimination process is supplied to the compression section 7 as a document type determination signal.

Further, the blank document determination section 53 can carry out a blank document discrimination process of determining, based on the image data, whether the document is a blank document or not (whether the document is blank or not). A determination result of the blank document discrimination process is supplied to the compression section 7 as a blank document determination signal.

The operations of the automatic document type discrimination section 5 are carried out regardless of which mode is selected as the color setting.

The segmentation process section 6 determines into which image region each pixel of an input image is classified, based on the RGB image data transmitted from the automatic document type discrimination section 5, and generates a segmentation class signal indicating a determination result thereof. Examples of the image region thus classified in the segmentation process section 6 may be a black text region, a color text region, a halftone dot region, and the like. The segmentation process is carried out not only in such a manner that the image region determination is carried out with respect to each pixel, but may be also carried out in such a manner that the image region determination is carried out with respect to each block including a plurality of pixels.

The compression section 7 is a block for compressing (encoding) the image data (RGB signals) transmitted from the automatic document type discrimination section 5. The compressing is carried out, for example, by a JPEG (Joint Photographic Experts Group) method.

The segmentation class signal compression section 8 is a block for compressing (encoding) the segmentation class signal of each pixel. The compressing in the segmentation class signal compression section 8 is carried out, for example, by an MMR (Modified Modified Read) method, or an MR (Modified Read) method, each as a lossless compression method.

The control section 108 stores, in the storage device 107, encoded codes (encoded image data) supplied from the compression section 7, segmentation class signal codes (encoded segmentation class signals) supplied from the segmentation class signal compression section 8, and data indicating the determination result of the automatic color discrimination process, which data is outputted from the compression section 7 as the color/monochrome determination signal, so that they are correlated with each other, and manages them as filing data. In a case where the document is constituted by a plurality of pages, image data per page and a determination result per page from the color/monochrome determination section 51 are correlated with each other and stored in the storage device 107.

In a case where a preview display operation is designated, the control section 108 reads out an encoded code and a segmentation class signal code correlated with the encoded code and supplies them to the decompression section 9 and the segmentation class signal decompression section 10, respectively.

The control section 108 writes, in a management table, a storage address of the encoded code or a data name and a storage address of the segmentation class signal code so that they are correlated with each other. That is, the control section 108 controls reading or writing of encoded codes and segmentation class signal codes, with the use of the management table.

The decompression section 9 carries out a decompression (decode) process with respect to the encoded code so as to decompress (decode) the encoded code into RGB image data. Further, the segmentation class signal decompression section 10 carries out a decompression (decode) process with respect to the segmentation class signal code so as to obtain a decoded segmentation class signal code. The decoded segmentation class signal is supplied to the black generation and under color removal section 14, the spatial filter section 15, and the halftone generating section 18. Each of the black generation and under color removal section 14, the spatial filter section 15, and the halftone generating section 18 changes its image processing depending on an image region type.

As shown in FIG. 1, the segmentation class signal decompression section 10 supplies the decoded segmentation class signal to the spatial filter section 15 and the output tone correction section 17 at the time of the preview display.

The image-quality adjustment section 11 receives the RGB image data sent from the decompression section 9, detects a page background of the RGB image data, and carries out a page background removal correction with respect to the RGB image data. Further, the image-quality adjustment section 11 adjusts a balance of RGB (color adjustment, whole color adjustment of a reddish or bluish tone), brightness, and sharpness, based on setting information inputted by the user from an operation panel (not shown).

In a case where the single-color mode is selected, the image-quality adjustment section 11 converts the RGB image data into CMY image data (CMY are complementary colors to RGB). The converting of the RGB image data into the CMY image data in the single-color mode is carried out in accordance with the following formula (1):

Math. 1 (1)

$$\begin{pmatrix} C \\ M \\ Y \end{pmatrix} = \begin{pmatrix} r1 \cdot a1 & r1 \cdot a2 & r1 \cdot a3 \\ r2 \cdot a1 & r2 \cdot a2 & r2 \cdot a3 \\ r3 \cdot a1 & r3 \cdot a2 & r3 \cdot a3 \end{pmatrix} \times \begin{pmatrix} R \\ G \\ B \end{pmatrix} + \begin{pmatrix} r1 \cdot c \\ r2 \cdot c \\ r3 \cdot c \end{pmatrix}$$

$a1 = -0.23046875$
$a2 = -0.79296875$
$a3 = 0.0234375$
$c = 255$ where coefficients r1 to r3 are defined based on [Table 1]. For example, in a case where the user selects cyan as a desired color in the single-color mode, values of r1 to r3 in a field "Cyan" in Table 1 are referred and selected such that r1=1, r2=0, and r3=0.

TABLE 1

| Adjustment Plane | Output Color (Single Color) | | | | | |
|---|---|---|---|---|---|---|
| | Red | Green | Blue | Cyan | Magenta | Yellow |
| r1 | 0 | 1 | 1 | 1 | 0 | 0 |
| r2 | 1 | 0 | 1 | 0 | 1 | 0 |
| r3 | 1 | 1 | 0 | 0 | 0 | 1 |

That is, in a case of the full-color mode, the image-quality adjustment section 11 outputs RGB image data, as shown in FIG. 1. On the other hand, in a case where the single-color mode is selected, the image-quality adjustment section 11 outputs CMY image data, as shown in (a) of FIG. 2. In a case where the two-color mode is selected, the image-quality adjustment section 11 outputs RGB image data, as shown in (b) of FIG. 2. (a) of FIG. 2 shows partial blocks of the image processing apparatus 102 at a time when the preview display process is carried out in the copier mode and the single-color mode. (b) of FIG. 2 shows partial blocks of the image processing apparatus 102 at a time when the preview display process is carried out in the copier mode and the two-color mode.

Further, adjustment of sharpness carried out in the image-quality adjustment section 11 can be realized by use of a matrix of the formula (1) by changing each of the values r1 to r3 and values a1 to a3 in the matrix. On this account, the adjustment of sharpness and the converting of image data (from RGB to CMY) in the single-color mode can share the matrix and therefore share an image processing circuit. For this reason, in the present embodiment, the adjustment of sharpness and the converting of image data in the single-color mode are carried out in the same process section (the image-quality adjustment section 11).

In a case where the monochrome mode is selected, the image-quality adjustment section 11 converts the RGB image data received from the decompression section 9 into K image data (grayscale data) and supplies the K image data to the two color printing process section 12. The K image data supplied from the image-quality adjustment section 11 passes through the two color printing process section 12, the color correction section 13, and the black generation and under color removal section 14 without any modification.

In a case where the two-color mode is selected, the two color printing process section 12 converts the RGB image data received from the image-quality adjustment section 11 into CMY image data, as shown in (b) of FIG. 2. The converting of the RGB image data into the CMY image data in the two-color mode can be realized, for example, by a method of [Example 1] or [Example 2] disclosed in Japanese Patent Application Publication, Tokukai, No. 2007-28336 A.

Further, in a case where the full-color mode is selected, the two color printing process section 12 does not carry out any process with respect to the RGB image data received from the image-quality adjustment section 11, and supplies the RGB image data as received to the color correction section 13 without any modification, as shown in FIG. 1 (the RGB image data passes through the two color printing process section 12). Further, in a case where the single-color mode is selected, the two color printing process section 12 does not carry out any process with respect to the CMY image data received from the image-quality adjustment section 11, and supplies the CMY image data as received to the color correction section 13 without any modification, as shown in (a) of FIG. 2 (the CMY image data passes through the two color printing process section 12).

The color correction section 13 receives the RGB image data in the full-color mode. The RGB image data is data adapted to a color space of a scanner (the image input apparatus 101). The color correction section 13 converts the RGB image data into R'G'B' image data that is adapted to a color space of the image display device 104.

That is, the color correction section 13 converts the RGB image data adapted to image reading characteristics of the scanner into the R'G'B' image data adapted to display characteristics of the display apparatus. The converting of the RGB image data into the R'G'B' image data is realized by looking up corresponding output values in an LUT in which input values (RGB) and output values (R'G'B') are stored so as to be correlated with each other.

In the present embodiment, in the full-color mode, an image processing circuit is shared by the after-mentioned converting of RGB image data into CMYK image data in a printing process and the converting of RGB image data into R'G'B' image data at the time of the preview display.

FIG. 1 shows the image forming apparatus 100 in the full-color mode, and the color correction section 13 receives RGB image data in the full-color mode. However, in the single-color mode or the two-color mode, the color correction section 13 receives CMY image data, as shown in (a) and (b) of FIG. 2.

In the single-color mode or the two-color mode, the color correction section 13 converts the CMY image data into R'G'B' image data. That is, the color correction section 13 converts the CMY image data adapted to printing characteristics of the printing process into R'G'B' image data adapted to display characteristics of the display apparatus. The color correction process is also realized by looking up corresponding output values in an LUT (look up table) in which input values (CMY) and output values (R'G'B') are stored so as to be correlated with each other.

The black generation and under color removal section 14 does not carry out any process with respect to the R'G'B' image data received from the color correction section 13 in any of the single-color mode, the two-color mode, and the full-color mode, and supplies the R'G'B' image data as received to its subsequent spatial filter section 15 without any modification, as shown in FIG. 1 and FIG. 2 (the R'G'B' image data passes through the black generation and under color removal section 14).

The spatial filter section 15 carries out a spatial filtering process (an edge enhancement process, a smoothing process, or the like) with respect to the R'G'B' image data received from the black generation and under color removal section 14 by use of a digital filter based on the segmentation class signals. That is, the spatial filter section 15 carries out different image processing with respect to respective image regions based on the segmentation class signals.

The enlarging/reducing section 16 carries out a downsampling process (a process of reducing the number of pixels) of converting the number of pixels of an image formed by the R'G'B' image data supplied from the spatial filter section 15, into the number of pixels of the image display device 104. The image display device 104 included in the operation panel of the image forming apparatus 100 has a low resolution as compared with a resolution of image data to be printed, and is generally a very small display. For this reason, it is necessary to carry out the downsampling process with respect to the image data at the time of the preview display. Further, the enlarging/reducing section 16 carries out an enlarging/reducing process of the image in accordance with an enlarging/ reducing (zooming) command (information indicative of a display copy ratio, for example, a fixed copy ratio from 2 to 4) inputted from the operation panel (not shown) included in the image forming apparatus 100.

The output tone correction section 17 carries out an output gamma correction process with respect to the image data received from the enlarging/reducing section 16, based on the segmentation class signals. More specifically, the output tone correction section 17 selects different gamma curves for respective image regions, based on the segmentation class signals, so as to carry out different output gamma correction processes with respect to the respective image regions. For example, with respect to a region except for a text region, a gamma curve adapted to the display characteristics of the image display device 104 is selected, while a gamma curve for displaying a text sharply is selected with respect to the text region. Here, (a) of FIG. 8 shows a gamma curve adapted to the display characteristics of the image display device 104. Further, (b) of FIG. 8 shows a gamma curve, drawn in full line, for displaying a text sharply. A gamma curve drawn in dotted line shown in (b) of FIG. 8 is a gamma curve adapted to the display characteristics of the image display device 104, shown for comparison with the gamma curve for displaying a text sharply.

In the present embodiment, the output tone correction section 17 selects a gamma curve based on the segmentation class signal. However, it is also possible to carry out an output tone correction only with the use of the gamma curve of (a) of FIG. 8, without selecting the gamma curve based on the segmentation class signal.

The halftone generating section 18 does not carry out any process with respect to the R'G'B' image data received from the output tone correction section 17, and supplies the R'G'B' image data as received to its subsequent image display device 104 without any modification (the R'G'B' image data passes through the halftone generating section 18). Accordingly, the image display device 104 can display a preview of the target image to be copied, based on the R'G'B' image data.

The output gamma correction process carried out in the output tone correction section 17 may be carried out in the image-quality adjustment section 11.

Furthermore, in a case where the color setting is set to the full-color mode at the time of the preview display in the copier mode, the image forming apparatus 100 displays, on the image display device 104, identification information (for example, a text indicative of "full color") to inform the user that output processing (printing process/display process) is carried out in full color. In a case where the color setting is set to the monochrome mode at the time of the preview display in the copier mode, the image forming apparatus 100 displays, on the image display device 104, identification information (for example, a text indicative of "black and white") to inform the user that the output processing is carried out in a black-and-white mode.

Such identification information (the text indicative of "full color" or "black and white") to inform the user that the output processing is carried out in full color or monochrome is displayed together with a previewed image in such a manner that the identification information and the previewed image do not overlap each other. Further, the arrangement may be also such that the identification information is displayed when a predetermined button (for example, an "display output" key in FIG. 16) is pressed during displaying the previewed image.

As an automatic color discrimination process method carried out in the automatic document type discrimination section 5, it is possible to adopt a method disclosed in Japanese Patent Application Publication, Tokukaihei, No. 4-282968 A. The method is as follows. Initially, it is determined whether each pixel is a color pixel or a black-and-white pixel (monochrome pixel). In a case where a continuous color pixel group in which a not less than predetermined number of color pixels are continued in a predetermined order of pixels is detected, the continuous color pixel group is recognized as a color block. If there are not less than a predetermined number of color blocks in a certain line, the line is regarded as a color line. If a predetermined number of color lines are included in a document image, the document image is determined as a color image, and if not, the document image is determined as a black and white image (monochrome image).

(1-2) Re-Preview Display

With reference to FIG. 4 and FIG. 5, the following explains about each process carried out in each of the blocks of the image processing apparatus 102 in a case where the color setting is changed in response to an instruction from the user and the target image to be printed is re-previewed. FIG. 4 is a block diagram showing the same image forming apparatus 100 as in FIG. 1. FIG. 4 shows a flow of image data at a time when a re-preview display is carried out in the copier mode and the auto color section mode.

The A/D (analogue/digital) conversion section 2, the shading correction section 3, the input processing section 4, the automatic document type discrimination section 5, the segmentation process section 6, the compression section 7, and the segmentation class signal compression section 8 do not carry out any operation related to the re-preview and therefore are not explained here.

In a case where an instruction to change the color setting and an instruction on a re-preview display operation are inputted, the control section 108 reads out an encoded code of image data to be re-previewed and a segmentation class signal code correlated with the encoded code, and data indicative of a determination result of the automatic color discrimination process, each from the storage device 107, and supplies the encoded code and the data indicative of the determination result to the decompression section 9, and the segmentation class signal code to the segmentation class signal decompression section 10.

The decompression section 9 carries out the decompression (decode) process with respect to the encoded code so as to decompress (decode) the encoded code to RGB image data.

At the time of the re-preview display, the segmentation class signal decompression section 10 decompresses (decodes) the segmentation class signal code so as to obtain a decoded segmentation class signal, and supplies the decoded segmentation class signal to the spatial filter section 15 and the output tone correction section 17, as shown in FIG. 4.

The image-quality adjustment section 11 receives the RGB image data sent from the decompression section 9, detects a page background in the RGB image data, and carries out the page background removal correction with respect to the RGB image data. Further, the image-quality adjustment section 11 adjusts a balance of RGB (color adjustment, whole color adjustment of a reddish or bluish tone), brightness, and sharpness, based on setting information inputted by the user from the operation panel (not shown).

As shown in FIG. 4, in a case where the color setting is changed to the auto color selection mode and data indicative of the determination result of the automatic color discrimination process, sent from the decompression section 9, indicates a monochrome document, the image-quality adjustment section 11 converts the RGB image data into K image data (grayscale data), and then supplied the K image data to the two color printing process section 12. The converting is carried out in accordance with a predetermined matrix coefficient and the following formula (2).

$$\text{Luminance Level(value of } K \text{ image data)}=0.299r+0.587g+0.114b \qquad (2)$$

In the formula (2), r represents a value (density level) of red image data, g represents a value of green image data, and b represents a value of blue image data.

On the other hand, in the auto color selection mode, in a case where the data indicative of the determination result of the automatic color discrimination process, sent from the decompression section 9, indicates a color document, the image-quality adjustment section 11 carries out the same process as in the preview display process in the full-color mode.

As shown in FIG. 5, in a case where the color setting is set to a mode except for the auto color selection mode, the image-quality adjustment section 11 carries out the same process as in the preview display process.

As shown in FIG. 4, in a case where the two color printing process section 12 receives the K image data from the image-quality adjustment section 11 in the auto color selection mode, the two color printing process section 12 supplies the K image data as received to the color correction section 13 without any modification (the K image data passes through the two color printing process section 12). On the other hand, in a case where the two color printing process section 12 receives RGB image data from the image-quality adjustment section 11 in the auto color selection mode, the two color printing process section 12 carries out the same process as in the preview display process in the full-color mode.

Further, as shown in FIG. 5, in a case where the color setting is set to a mode other than the auto color selection mode, the two color printing process section 12 carries out the same process as in the preview display process.

In the auto color selection mode, the color correction section 13 receives RGB image data or K image data. Further, in the full-color mode, the color correction section 13 receives RGB image data. The RGB image data is data adapted to a color space of the scanner (the image input apparatus 101). In a case where the color correction section 13 receives the RGB image data from the two color printing process section 12, the color correction section 13 converts the RGB image data into R'G'B' image data adapted to a color space of the image display device 104. The converting of the RGB image data into the R'G'B' image data is carried out in the same manner as in the preview display process by looking up corresponding output values in an LUT in which input values (RGB) and output values (R'G'B') are stored so as to be correlated with each other. Further, in a case where the color correction section 13 receives K image data from the two color printing process section 12, the color correction section 13 supplies the K image data as received to the black generation and under color removal section 14 without any modification (the K image data passes through the color correction section 13).

In the single-color mode or the two-color mode, the color correction section 13 carries out the same process as in the preview display process, as shown in (a) and (b) of FIG. 5.

As shown in FIG. 4 and FIG. 5, in any of the single-color mode, the two-color mode, the full-color mode, and the auto color selection mode, the black generation and under color removal section 14 does not carry out any process with respect to the R'G'B' image data (or the K image data) received from the color correction section 13, and supplies the image data as received to its subsequent spatial filter section 15 (the image data passes through the black generation and under color removal section 14).

The spatial filter section 15 carries out the spatial filtering process (the edge enhancement process, the smoothing process, or the like) with respect to the R'G'B' image data received from the black generation and under color removal section 14 by use of the digital filter based on the segmentation class signals. That is, the spatial filter section 15 carries out different image processing with respect to respective image regions based on the segmentation class signals, similarly to the preview process.

Further, in a case where the spatial filter section 15 receives the K image data from the black generation and under color removal section 14, the spatial filter section 15 carries out a blur process or the like with respect to the K image data by use of the digital filter.

The enlarging/reducing (zoom process) section 16 carries out the downsampling process (the process of reducing the number of pixels) of converting the number of pixels of an image formed by the R'G'B' image data received from the spatial filter section 15, into the number of pixels of the image display device 104. The image display device 104 included in the operation panel of the image forming apparatus 100 has a low resolution as compared with a resolution of image data to be printed, and is generally, a very small display. For this reason, it is necessary to carry out the downsampling process with respect to the image data at the time of the preview display. Further, the enlarging/reducing section 16 carries out the enlarging/reducing process of the image in accordance with an enlarging/reducing (zooming) command (information indicative of a display copy ratio, for example, a fixed copy ratio from 2 to 4) inputted from the operation panel (not shown) included in the image forming apparatus 100.

In a case where the enlarging/reducing section 16 receives the K image data from the spatial filter section 15, the enlarging/reducing section 16 also carries out the downsampling process with respect to the K image data.

The output tone correction section 17 carries out the output gamma correction process with respect to the image data received from the enlarging/reducing section 16, based on the segmentation class signals, similarly to the preview display process.

The halftone generating section 18 does not carry out any process with respect to the R'G'B' image data (or the K image data) received from the output tone correction section 17, and supplies the image data as received to its subsequent image display device 104 without any modification (the image data passes through the halftone generating section 18). Accordingly, the image display device 104 can display a re-preview of the target image to be copied, based on the R'G'B' image data (or the K image data).

The output gamma correction process carried out in the output tone correction section 17 may be carried out in the image-quality adjustment section 11.

(1-3) Printing Process (Image Print Job)

With reference to FIG. 6, the following explains about each process carried out by each of the blocks in the image processing apparatus 102 in a case where a printing process of the target image to be printed is carried out without the preview display, in the copier mode and the full-color mode. FIG. 6 is a block diagram showing the same image forming apparatus 100 as in FIG. 1, and shows a flow of image data at a time when the printing process is carried out in the copier mode and the full-color mode.

The A/D (analogue/digital) conversion section 2, the shading correction section 3, the input processing section 4, the segmentation process section 6, the compression section 7, the segmentation class signal compression section 8, the decompression section 9, the image-quality adjustment section 11, and the two color printing process section 12 each carry out the same process as in the preview display process, and therefore are not explained here.

The automatic document discrimination section 5 determines which type a document read out in the image input apparatus 101 belongs to, based on RGB image data (RGB density signals) subjected to a gamma correction or the like process in the input processing section 4. Exemplary document types determined here may be a text document, a printed-picture document, a text/printed-picture document that includes a text and a printed-picture, and the like. Further, the automatic document type discrimination section 5 can also carry out, based on the image data, the automatic color discrimination process (ACS: Auto Color Selection) of determining whether the readout document is a color document or a black and white document (monochrome document), the blank document discrimination process of determining whether the readout document is a blank document or not (whether the document is blank or not). RGB image data supplied from the automatic document type discrimination section 5 is inputted in the segmentation process section 6 and the compression section 7.

Each of the image-quality adjustment section 11, the two color printing process section 12, the color correction section 13, and the black generation and under color removal section 14 carries out a process, following an inputted color setting. That is, in a case of receiving no instruction to change a color setting that has been initially selected when a job execution instruction (in this case, an execution instruction of the copier mode) has been received, each of the sections carries out a process, following the initially selected color setting. On the other hand, in a case of receiving an instruction to change the color setting that has been initially selected when the job execution instruction (the execution instruction of the copier mode) has been received, the color correction section 13 carries out a process, following a color setting that is changed in response to the instruction.

In each mode, the image-quality adjustment section 11 and the two color printing process section 12 each carry out the same process as in the preview display.

In a case where the full-color mode is selected, the color correction section 13 carries out the color correction process of converting RGB image data received from the two color printing process section 12 into CMY image data and also carries out a process of improving color reproduction with respect to the CMY image data. The converting of the RGB image data into the CMY image data is realized by looking up corresponding output values in an LUT in which input values (RGB) and output values (CMY) are stored so as to be correlated with each other.

Further, in a case where the single-color mode or the two-color mode is selected, the color correction section 13 does not carry out any process with respect to the CMY image data received from the two color printing process section 12 and supplies the CMY image data as received to the black generation and under color removal section 14 without any modification, as shown in (a) and (b) of FIG. 7 (the CMY image data passes through the color correction section 13).

Furthermore, in a case where the auto color selection mode is selected, each of the image-quality adjustment section 11, the two color printing process section 12, the color correction section 13, and the black generation and under color removal section 14 carries out a process in accordance with the determination result of the automatic color discrimination process stored in the storage device 107. That is, in a case where the determination result indicates a color document, each of the sections carries out a process in accordance with the full-color mode. On the other hand, in a case where the determination process indicates a monochrome document, each of the sections carries out a process in accordance with the monochrome mode.

In a case where the full-color mode or the two-color mode is selected, the black generation and under color removal section 14 carries out black generation for generating black (K) image data from the CMY image data received from the color correction section 13 and further generates new CMY image data by subtracting the black (K) image data from the CMY image data as received. Accordingly, in the case where the full-color mode or the two-color mode is selected, the CMY image data is converted into four-color (CMYK) image data by the black generation and under color removal section 14, as shown in FIG. 6 and (b) of FIG. 7.

Further, in a case where the single-color mode is selected, the black generation and under color removal section 14 does not carry out any process with respect to the CMY image data received from the color correction section 13 and supplies the CMY image data as received to its subsequent spatial filter section 15, as shown in (a) of FIG. 7 (the CMY image data passes through the black generation and under color removal section 14).

In the case where the full-color mode or the two-color mode is selected, the black generation and under color removal section 14 supplies CMYK image data and its subsequent blocks receive and supply the CMYK image data, as shown in FIG. 6 and (b) of FIG. 7. However, in the case where the single-color mode is selected, the black generation and under color removal section 14 supplies CMY image data and its subsequent blocks receive and supply the CMY image data, not like in FIG. 6.

The spatial filter section 15 carries out the spatial filtering process (the edge enhancement process, the smoothing process, or the like) with respect to the CMYK or CMY image data received from the black generation and under color removal section 14 based on the segmentation class signals. That is, the spatial filter section 15 carries out different image processing with respect to respective image regions based on the segmentation class signals, similarly in the preview display process.

The enlarging/reducing section 16 carries out the enlarging/reducing process of an image in accordance with an enlarging/reducing command (information indicative of a copy ratio of a print image) inputted by the user from the operation panel (not shown).

The output tone correction section 17 carries out the output gamma correction process with respect to the image data received from the enlarging/reducing section 16, for outputting the image data on a recording medium such as paper. The halftone generation section 18 carries out a tone reproduction process (halftone producing process) necessary for the image output apparatus 103 to print an image, with the use of an error diffusion method or a dither method.

The halftone generation section 18 supplies the CMYK or CMY image data processed to the image output apparatus 103, and the image output apparatus 103 prints the image of the image data on a recording medium (paper or the like).

In a case where an instruction to print the target image to be printed is inputted in the copier mode and the full-color mode after the target image is previewed, the control section 108 reads out an encoded code of image data of the target image to be printed, a segmentation class signal code correlated to the encoded code, and data indicative of a determination result of the automatic color discrimination process, each from the storage device 107, and supplies the encoded code and the data of the determination result to the decompression section 9, and the segmentation class signal code to the segmentation class signal decompression section 10. Here, each of the A/D (analogue/digital) conversion section 2, the shading correction section 3, the input processing section 4, the automatic document type discrimination section 5, the segmentation process section 6, the compression section 7, and the segmentation class signal compression section 8 does not carry out any operation related to the printing after the preview display.

Each of the segmentation class signal decompression section 10, the image-quality adjustment section 11, the two color printing process section 12, the color correction section 13, the black generation and under color removal section 14, and the spatial filter section 15, the enlarging/reducing section 16, the output tone correction section 17, and the halftone generation section 18 operates in the same manner as in the printing process without displaying a preview, and therefore is not explained here.

(1-4) Operation/Non-Operation of Each Block

As described above, in a case of the printing process in the full-color mode, the two color printing process section 12, among the blocks from the image-quality adjustment section 11 to the halftone generation section 18, does not operate, but the other blocks operate (see FIG. 6.). Meanwhile, in a case of the preview display (re-preview display) of an image that is determined as a color document in the auto color selection mode or in a case of the preview display (re-preview display) in the full-color mode, the two color printing process section 12, the black generation and under color removal section 14, and the halftone generation section 18, among the blocks from the image-quality adjustment section 11 to the halftone generation section 18, do not operate, but the other blocks operate (see FIG. 1).

Further, in a case of the printing process in the two-color mode, the color correction section 13, among the blocks from the image-quality adjustment section 11 to the halftone generation section 18, does not operate, but the other blocks operate (see (b) of FIG. 7). Meanwhile, in a case of the preview display (re-preview display) in the two-color mode, the black generation and under color removal section 14 and the halftone generation section 18, among the blocks from the image-quality adjustment section 11 to the halftone generation section 18, do not operate, but the other blocks operate (see (b) of FIG. 2, and (b) of FIG. 5).

Further, in a case of the printing process in the single-color mode, the two color printing process section 12, the color correction section 13, and the black generation and under color removal section 14, among the blocks from the image-quality adjustment section 11 to the halftone generation section 18, do not operate, but the other blocks operate (see (a) of FIG. 7). Meanwhile, in a case of the preview display in the single-color mode, the two color printing process section 12, the black generation and under color removal section 14, and the halftone generation section 18, among the blocks from the image-quality adjustment section 11 to the halftone generation section 18, do not operate, but the other blocks operate (see (a) of FIG. 2, (a) of FIG. 5).

Furthermore, in a case of the re-preview display or the printing process after the preview display, any of the A/D conversion section 2 through the segmentation class signal compression section 8 does not operate regardless of which mode is set as a color setting.

(1-5) Process Procedure

The following deals with one example of a process procedure in a case where the copier mode and the full-color mode are selected, with reference to FIG. 9. FIG. 9 is a flow chart showing one example of a process procedure of the image forming apparatus in a case where the copier mode and the full-color mode are selected.

In the image forming apparatus 100, when the copier mode is selected and a start key is pressed (YES in S1), a document is scanned (S2) so as to generate RGB analogue signals. Here, before pressing the start key in S1, the user inputs setting information on whether a preview display is necessary or not, so that the user sets whether the preview display is carried out or not in the image forming apparatus 100.

After S2, the image forming apparatus 100 converts the RGB analogue signals into RGB image data (digital data) (S3), carries out a shading correction with respect to the RGB image data (S4), and carries out an input gamma correction process with respect to the RGB image data that has been subjected to the shading correction (S5).

After S5, the image forming apparatus 100 carried out the document type discrimination process and the segmentation process based on the RGB image data (S6), and stores the RGB image data in the storage device 107 (S7).

After S7, the image forming apparatus 100 determines whether or not "Preview Display: Yes" has been set (S8). In cases where "Preview Display: Yes" is not set, the image forming apparatus 100 carries out Steps S9 through S16. In cases where "Preview Display: Yes" has been set, the image forming apparatus 100 carries out Steps S17 through S23. In the following description, Steps S9 through S16 will be initially explained and then Steps in S17 through S23 will be explained.

In the cases where "Preview Display: Yes" has not been set (NO in S8), the image forming apparatus 100 reads out the RGB image data from the storage device 107, and carries out an image-quality adjustment process such as the page background removal correction and the sharpness adjustment (S9). After that, the image forming apparatus 100 converts the RGB image data adapted to scanner characteristics, into CMY image data adapted to printer characteristics (S10), and further converts the CMY image data into CMYK image data (S11). Subsequently, the image forming apparatus 100 carries out the spatial filtering process with respect to the CMYK image data based on a result of the segmentation process (S12), and then carries out the enlarging/reducing process with respect to the CMYK image data that has been subjected to the spatial filtering process (S13). After S13, the image forming apparatus 100 carries out the output gamma correction process and the tone reproduction process with respect to the CMYK image data (S14, S15), and then prints an image of the CMYK image data on paper (S16). Here, the processing is completed.

In the cases where it is determined that "Preview Display: Yes" has been set in S8 (YES in S8), the image forming apparatus 100 reads out the RGB image data from the storage device 107, and carries out the image-quality adjustment process, which is the same process as that in S9 (S17). Then, the image forming apparatus 100 converts the RGB image data adapted to the scanner characteristics, into R'G'B' image data adapted to the characteristics of the display apparatus (S18). After S18, the image forming apparatus 100 carries out the spatial filtering process with respect to the R'G'B' image data based on the result of the segmentation process (S19), and carries out the downsampling process with respect to the R'G'B' image data so that the R'G'B' image data is adapted to a resolution and a size of a display (S20). After S20, the image forming apparatus 100 carries out the output gamma correction process with respect to the R'G'B' image data based on the result of the segmentation process (S21). Subsequently to S21, the image forming apparatus 100 carries out a preview display based on the R'G'B' image data (S22). After S22, in a case where the user inputs a command to change a color setting of an image previewed (YES in S23), the image forming apparatus 100 reads out, from the storage device 107, the RGB image data and data indicative of a determination result of the automatic color discrimination process, and carries out the re-preview display process according to a changed color setting (S24), and returns to the process in S23.

In a case where the user does not input any command to change the color setting of the image thus previewed (NO in S23) but inputs a print-permission command (YES in S25), the image forming apparatus 100 reads, from the storage device 107, the RGB image data and the data indicative of the determination result of the automatic color discrimination process again, and carries out the printing process based on these data. In a case where the user inputs a print-cancel command (NO in S25), the image forming apparatus 100 completes the processing.

(1-6) User Interface of Image Display Device

With reference to FIG. 15 through FIG. 18, FIG. 20, and FIG. 21 explained is how a user interface is changed (screen shift) from the preview display in the copier mode to the re-preview display carried out when the user inputs an instruction to change the color setting.

FIG. 15 shows a screen from which setting of whether the preview display is carried out or not is inputted, and shows a user interface displayed on the image display device 104. In a "color mode", the user can select, as a color setting, the full-color mode, the auto color selection mode, the monochrome mode, the single-color mode, or the two-color mode. Further, in a case where a preview button is selected and a start button is pressed, "Preview Display: Yes" is set. In a case where the preview button is not selected and the start button is pressed, "Preview Display: No" is set.

FIG. 16 shows a user interface displayed on the image display device 104 in a case where the user selects the monochrome mode as the "color mode" in the user interface shown in FIG. 15.

Since the monochrome mode is set, "monochrome" is displayed as a document type and a previewed image is a monochrome image. A "reset" button is a button to be selected when the color setting for a displayed document is to be changed. When the "reset" button is selected, a user interface of FIG. 17 is displayed on the image display device 104.

FIG. 17 shows a user interface from which resetting of "color mode", "two-sided copy", and/or "special modes" is carried out. When the user selects "color mode" to change the color setting, a user interface of FIG. 18 is displayed on the image display device 104. The "special modes" is selected in a case where an image is printed in 2 in 1 or 4 in 1, or a date, the number of pages, a stamp, or the like is added to a document.

FIG. 18 shows a user interface from which the full-color mode, the auto color selection mode, the black and white (monochrome) mode, the single-color mode, or the two-color mode is selected as the "color mode". When the user selects any one of the modes (for example, the full-color mode), a confirmation screen as shown in FIG. 20 is displayed. When the user confirms the selected mode, a user interface of a re-preview display according to the color setting thus reset (for example, the full-color mode) is displayed on the image display device 104, as shown in FIG. 21.

(2) Facsimile Transmission Mode (2-1) Transmission Process (Image Transmission Job)

FIG. 10 is a block diagram showing the same image forming apparatus 100 as in FIG. 1, and shows a flow of image data at a time when a transmission process is carried out in the black-and-white mode in the facsimile transmission mode without previewing an image of the image data. Each of the A/D (analogue/digital) conversion section 2, the shading correction section 3, the input processing section 4, the automatic document type discrimination section 5, the segmentation process section 6, the compression section 7, the segmentation class signal compression section 8, and the decompression section 9 carries out the same process in the copier mode, and therefore is not explained here.

In the facsimile transmission mode, the segmentation class signal decompression section 10 reads out a segmentation class signal code from the storage device 107, decompresses (decodes) the segmentation class signal code so as to obtain a decoded segmentation class signal, and transmits the decoded segmentation class signal to the spatial filter section 15.

The image-quality adjustment section 11 converts RGB image data received from the decompression section 9 into K image data (grayscale data).

The two color printing process section 12, the color correction section 13, the black generation and under color removal section 14 do not carry out any process with respect to the K image data (signal) supplied from the image-quality adjustment section 11, and pass the K image data as received to the following spatial filter section 15 without any modification (the K image data passes through these sections to the spatial filter section 15).

The spatial filter section 15 carries out the spatial filtering process (the edge enhancement process, the smoothing process, or the like) with respect to the K image data with the use of the digital filter based on the segmentation class signals. The enlarging/reducing section 16 carries out the enlarging/reducing process with respect to the K image data in accordance with a transmission resolution. The output tone correction section 17 carries out the output gamma correction process (gamma correction to output an image of the K image data on a recording medium such as paper) with respect to the K image data received from the enlarging/reducing section 16. The halftone generation section 18 converts the K image data into binary image data, for example, by the error diffusion method. The binary image data is subjected to a rotation process in a rotation process section (not shown) as needed, and then compressed by a compression/decompression section (not shown) into a predetermined form, then stored in a memory (not shown).

Subsequently, the transmitting device (for example, a modem) 106 carries out a transmission procedure with a destination to assure a transmissive state. Then, the transmitting device 106 reads out the binary image data compressed in the predetermined form from the memory, carries out a necessary process, such as conversion in compression format, and then transmits the binary image data to the destination via a communications network.

In response to an instruction to carry out the transmission process in the facsimile transmission mode and the black-and-white mode after a preview is displayed, the control section 108 reads out an encoded code of image data of a target image to be transmitted, a segmentation class signal code correlated with the encoded code, and data indicative of a determination result of the automatic color discrimination process, each from the storage device 107, and supplies the encoded code and the data indicative of the determination result to the decompression section 9, and the segmentation class signal code to the segmentation class signal decompression section 10. That is, the A/D (analogue/digital) conversion section 2, the shading correction section 3, the input processing section 4, the automatic document type discrimination section 5, the segmentation process section 6, the compression section 7, and the segmentation class signal compression section 8 do not carry out any operation related to the facsimile transmission, carried out after the preview is displayed.

Each of the segmentation class signal decompression section 10, the image-quality adjustment section 11, the two color printing process section 12, the color correction section 13, the black generation and under color removal section 14, the spatial filter section 15, the enlarging/reducing section 16, the output tone correction section 17, and the halftone generation section 18 carries out the same operation as in the facsimile transmission process without the preview display, and therefore is not explained here.

(2-2) Preview Display and Re-Preview Display

FIG. 11 is a block diagram showing the same image forming apparatus 100 as in FIG. 1, and shows a flow of image data at a time when a preview display process is carried out in the black-and-white mode in the facsimile transmission mode. The preview display in the facsimile transmission mode indicates a process of previewing an image to be facsimiled before the facsimile transmission of the image.

At the time of the preview display, each of the A/D conversion section 2, the shading correction section 3, the input processing section 4, the automatic document type discrimination section 5, the segmentation process section 6, the compression section 7, the segmentation class signal compression section 8, the decompression section 9, the segmentation class signal decompression section 10, the image-quality adjustment section 11, and the spatial filter section 15 carries out the same process as in the facsimile transmission process, and therefore is not explained here. Further, similarly in the facsimile transmission process, image data passes through the two color printing process section 12, the color correction section 13, and the black generation and under color removal section 14.

However, at the time of the preview display, differently from the transmission process, 3 pieces of K image data per pixel (the 3 pieces of K image data have the same value) are transmitted from the image-quality adjustment section 11 to the image display device 104 through the sections following the image-quality adjustment section 11. This is because the image display device 104, which is a full-color display, requires three values (image data) with respect to each pixel.

The enlarging/reducing section 16 carries out the down-sampling process with respect to the K image data received from the spatial filter section 15 so that the number of pixels of an image made of the K image data is modified to the number of pixels of a display size of the image display device 104. Further, the enlarging/reducing section 16 carries out the enlarging/reducing process of the image in accordance with an enlarging/reducing command (information indicative of a display copy ratio, for example, a fixed copy ratio from 2 to 4) inputted from the operation panel (not shown) included in the image forming apparatus 100.

The output tone correction section 17 carries out gamma correction with respect to the K image data received from the enlarging/reducing section 16 so that the K image data is adapted to the display characteristics of the image display device 104. The halftone generation section 18 does not carry out any process with respect to the K image data received from the output tone correction section 17 and supplies the K image data as received to its subsequent image display device 104 without any modification (the K image data passes through the halftone generation section 18). In this way, the image display device 104 can display a preview of the target image to be facsimiled, based on the K image data.

At the time of the preview display process in the facsimile transmission mode, it is arranged such that the image-quality adjustment section 11 converts RGB image data into 3 pieces of K image data. However, the arrangement is not limited to this, and may be also possible such that the RGB image data is processed until the output tone correction section 17 without being converted into K image data, and the RGB image data supplied from the output tone correction section 17 is converted into K image data by a browser.

A preview display process carried out by image forming apparatus 100 in the facsimile transmission mode and the full-color mode is the same as the preview display process carried out in the copier mode and the full-color mode, and therefore is not explained here.

Further, a re-preview display process carried out by the image forming apparatus 100 in the facsimile transmission mode is the same as the re-preview display process in the copier mode, and therefore is not explained here.

(2-3) Operation/Non-Operation of Each Block

As described above, in a case of the transmission process in the facsimile transmission mode, the two color printing process section 12, the color correction section 13, and the black generation and under color removal section 14, among the blocks from the image-quality adjustment section 11 through the halftone generation section 18, do not operate, but all the other blocks operate (see FIG. 10). In a case of the preview display in the facsimile transmission mode, the two color printing process section 12, the color correction section 13, the black generation and under color removal section 14, and the halftone generation section 18, among the blocks from the image-quality adjustment section 11 through the halftone generation section 18, do not operate, but all the other blocks operate (see FIG. 11).

Moreover, in a case of the re-preview display or the facsimile transmission process after the preview display, any of the A/D conversion section 2 through the segmentation class signal compression section 8 does not operate regardless of which mode is set as a color setting.

(2-4) Process Procedure

The following describes one example of a process procedure in the facsimile transmission mode. In a case where the user inputs a facsimile transmission command when "Preview Display: Yes" is not set in the image forming apparatus 100, image data is processed as shown in FIG. 10 and the image data is transmitted to an external apparatus.

Meanwhile, in a case where the user inputs the facsimile transmission command when "Preview Display: Yes" is set in the image forming apparatus 100, image data is processed as shown in FIG. 11 so that the image data is stored in the storage device 107, and a preview of an image of the image data is displayed on the image display device 104. When the user inputs a transmission-permission command while the preview is being displayed, the image data in the storage device 107 is read out. The read out image data is then processed in each of the blocks from the decompression section 9 through the halftone generation section 18, and finally transmitted to the external apparatus by the transmitting device 106, as shown in FIG. 10.

(3) Facsimile Reception Mode (3-1) Printing Process (Image Print Job)

FIG. 12 is a block diagram showing the same image forming apparatus 100 as in FIG. 1, and shows a flow of image data at a time when a printing process is carried out in the facsimile reception mode.

In a case of receiving a facsimile, the receiving device 105 carries out a communication procedure and receives K image data (1 bit) from a source communication device. The K image data received by the receiving device 105 is subjected to a decoding process in the encoding/decoding process section (not shown), then to the rotation process in the rotation process section (not shown) as needed, and finally to a resolution conversion process in a resolution conversion section (not shown) as needed. The processed image data is temporarily stored in the storage device 107.

The control section 108 supplies the image data written in the storage device 107, to the decompression section 9 in the image processing apparatus 102. The decompression section 9, the image-quality adjustment section 11, the two color printing process section 12, the color correction section 13, the black generation and under color removal section 14, the spatial filter section 15, the enlarging/reducing section 16, the output tone correction section 17, and the halftone generation section 18 do not carry out any process with respect to the image data transmitted from the storage device 107 and pass the image data to the subsequent image output apparatus 103 (the image data passes through these sections). The image output apparatus 103 forms an image on a recording medium (for example, paper) based on the K image data received from the halftone generation section 18. In the case where the printing process is carried out in the facsimile reception mode, no image processing is carried out as such. On this account, the image data stored in the storage device 107 may be directly supplied to the image output apparatus 103.

(3-2) Preview Display

FIG. 13 is a block diagram showing the same image forming apparatus 100 as in FIG. 1, and shows a flow of image data at a time when a preview display process is carried out in the facsimile reception mode. The preview display in the facsimile reception mode indicates a process of previewing an image to be printed before printing the image in a case where image data is received by facsimile and an image of the image data is to be printed.

At the time of the preview display in the facsimile reception mode, the control section 108 supplies image data written in the storage device 107 to the decompression section 9 in the image processing apparatus 102, similarly to the printing process in the facsimile reception mode. The decompression section 9 does not carry out any process with respect to the image data received from the storage device 107, and supplies the image data to a bit-number converting process section (not shown) (the image data passes through the decompression section 9). The bit-number converting process section converts a bit number of the image data received from the decompression section 9 (for example, converting 1 bit into 8 bits), and supplies the image data whose bit number has been converted, to its subsequent image-quality adjustment section 11. That is, although the bit-number converting process section is not shown in FIG. 13, the bit-number converting process section is provided between the decompression section 9 and the image-quality adjustment section 11, in FIG. 13.

The image-quality adjustment section 11 receives a piece of K image data for each pixel and generates 3 pieces of the K image data (the 3 pieces of the K image data have the same value). This is because the image display device 104, which is a full-color display, requires 3 values with respect to each pixel.

After that, the two color printing process section 12, the color correction section 13, and the black generation and under color removal section 14 do not carry out any process with respect to the K image data transmitted from the image-quality adjustment section 11 and passes the K image data as received to the subsequent spatial filter section 15, without any modification (the K image data passes through these sections). The spatial filter section 15 carries out the blur (smoothing) process or the like with respect to the K image data with the use of the digital filter.

The enlarging/reducing section 16 carries out the down-sampling process with respect to the K image data received from the spatial filter section 15 so that the number of pixels of an image made of the K image data is modified to the number of pixels of the display size of the image display device 104. Further, the enlarging/reducing section 16 carries out the enlarging/reducing process of the image in accordance with an enlarging/reducing command (information indicative of a display copy ratio, for example, a fixed copy ratio from 2 to 4) inputted from the operation panel (not shown) included in the image forming apparatus 100.

The output tone correction section 17 carries out output gamma correction with respect to the K image data received from the enlarging/reducing section 16 so that the K image data is adapted to the display characteristics of the image display device 104. The halftone generation section 18 does not carry out any process with respect to the K image data received from the output tone correction section 17 and supplies the K image data as received to its subsequent image display device 104 without any modification (the K image data passes through the halftone generation section 18). In this way, the image display 104 can display a preview of the image received by facsimile, based on the K image data.

(3-3) Operation/Non-Operation of Each Block

As described above, in a case of the printing process in the facsimile reception mode, any of the blocks from the image-quality adjustment section 11 through the halftone generation section 18 does not operate (see FIG. 12). However, in a case of the preview display in the facsimile reception mode, the two color printing process section 12, the color correction section 13, the black generation and under color removal section 14, and the halftone generation section 18, among the blocks from the image-quality adjustment section 11 through the halftone generation section 18, do not operate, but all the other blocks operate (see FIG. 13).

(3-4) Process Procedure

The following describes one example of a process procedure in the facsimile reception mode. In a case where the image forming apparatus 100 receives image data by facsimile, the received image data is temporarily written in the storage device 107. There is a time lag between writing of the image data in the storage device 107 and printing of an image of the image data. In a case where the user inputs "preview command" during the time lag, the image data is processed as shown in FIG. 13, so that the image of the image data is previewed on the image display device 104. In a case where the image is printed, the image data is processed as shown in FIG. 12, so that the image of the image data is printed by the image output apparatus 103.

(4) Image Transmission Mode (4-1) Transmission Process (Image Transmission Job)

In the image transmission mode, in a case where the image forming apparatus 100 carries out a transmission process without carrying out a preview display in the full-color mode, each of the image input apparatus 101, the A/D (analogue/digital) conversion section 2, the shading correction section 3, the input processing section 4, the automatic document type discrimination section 5, the segmentation process section 6, the compression section 7, the segmentation class signal compression section 8, and the decompression section 9 carries out the same process as in the copier mode. The segmentation class signal decompression section 10 supplies segmentation class signals to the spatial filter section 15 and the output tone correction section 17.

The image-quality adjustment section 11 carries out under color removal and color balance adjustment. The color correction section 13 converts image data into R"G"B" image data (for example, sRGB data) that is adapted to display characteristics of a display apparatus generally used. Then, the spatial filter section 15 carries out the spatial filtering process (the edge enhancement process, the smoothing process) with respect to the R"G"B" image data with the use of a digital filter based on the segmentation class signals. The enlarging/reducing section 16 carries out the enlarging/reducing process with respect to an image of the R"G"B" image data. Further, the output tone correction section 17 carries out correction with respect to a text region in the R"G"B" image data with the use of the gamma curve in (b) of FIG. 8, and carries out correction with respect to a region other than the text region in the R"G"B" image data with the use of the gamma curve in (a) of FIG. 8. The two color printing process section 12 and the black generation and under color removal section 14 do not carry out any process with respect to the image data supplied thereto and passes the image data as received to their subsequent blocks without any modification. Therefore, the output tone correction section 17 outputs the R"G"B" image data.

The R"G"B" image data thus supplied from the output tone correction section 17 is converted into an image file, such as a PDF file, by a format converting process section (not shown). Then, in a case of the scan to e-mail mode of the image transmission mode, the image file is attached to an e-mail in a mail process section (a job apparatus, not shown), and then the e-mail is transmitted to a destination via a network. In a case of the scan to ftp mode of the image transmission mode, the image file is transmitted to a predetermined folder. Further, in a case of the scan to usb mode of the image transmission mode, the image file is transmitted to a predetermined USB memory.

In a case where the transmission process is selected in the image transmission mode and the full-color mode after the preview display is carried out, the control section 108 reads out an encoded code of image data of a target image to be transmitted, a segmentation class signal code correlated with the encoded code, and data indicative of a determination result of the automatic color discrimination process, each from the storage device 107, and supplies the encoded code and the data indicative of the determination result to the decompression section 9, and the segmentation class signal code to the segmentation class signal decompression section 10. That is, the A/D (analogue/digital) conversion section 2, the shading correction section 3, the input processing section 4, the automatic document type discrimination section 5, the segmentation process section 6, the compression section 7, and the segmentation class signal compression section 8 do not carry out any operation related to the image transmission carried out after the preview display.

Each of the segmentation class signal decompression section 10, the image-quality adjustment section 11, the two color printing process section 12, the color correction section 13, the black generation and under color removal section 14, the spatial filter section 15, the enlarging/reducing section 16, the output tone correction section 17, and the halftone generation section 18 carries out the same operation as in the image transmission process without carrying out the preview display, and therefore is not explained here.

A transmission process carried out, after the preview display, by the image forming apparatus 100 in the image transmission mode and a grayscale mode is the same as the transmission process carried out, after the preview display, by the image forming apparatus 100 in the facsimile transmission mode and the black-and-white mode. Meanwhile, a transmission process carried out, after the preview display, by the image forming apparatus 100 in the image transmission mode and a black and white binarization mode is the same as the transmission process carried out, after the preview display, by the image forming apparatus 100 in the facsimile transmission mode and the black-and-white mode, but they are different in that the transmission process in the image transmission mode and the black and white binarization mode is such that the image-quality adjustment section 11 converts RGB image data into K image data (black-and-white binary image data made of black-and-white binary values) and supplied the K image data to the two color printing process section 12. Instead of the above conversion of the image-quality adjustment section 11, the two color printing process section 12 may converts K image data (black-and-white multilevel image data) into K image data (black-and-white binary image data).

A transmission process carried out, after the preview display, by the image forming apparatus 100 in the image transmission mode and the ACS mode is such that in a case where the image-quality adjustment section 11 receives data indicative of a determination result of the automatic color discrimination process that indicates a grayscale document, the image-quality adjustment section converts RGB image data into K image data (black-and-white multilevel image data) and supplies the K image to the two color printing process section 12. Meanwhile, in a case where the image-quality adjustment section 11 receives data indicative of a determination result of the automatic color discrimination process that indicates a black-and-white binary image document, the image-quality adjustment section 11 converts RGB image data into K image data (black-and-white binary image data) and supplies the K image data to the two color printing process section 12.

(4-2) Preview Display and Re-Preview Display

In a case where the image forming apparatus 100 is caused to operate in a preview display in the image transmission mode, each of the image input apparatus 101, the A/D (analogue/digital) conversion section 2, the shading correction section 3, the input processing section 4, the segmentation process section 6, the compression section 7, the segmentation class signal compression section 8, the decompression section 9, the segmentation class signal decompression section 10, and the two color printing process section 12 carries out the same process as in the transmission process in the image transmission mode.

Each of the automatic document type discrimination section 5 and the image-quality adjustment section 11 carries out the same process as in the preview display in the copier mode, and therefore is not explained here.

At the time of the preview display in the image transmission mode, the color correction section 13 converts RGB image data into R'G'B' image data adapted to a color space of the image display device 104.

Then, similarly in the transmission process, the spatial filter section 15 carries out the spatial filtering process (the edge enhancement process, the smoothing process) with respect to the R'G'B' image data with the use of a digital filter based on segmentation class signals. The enlarging/reducing section 16 carries out the downsampling process so that the R'G'B' image data is adapted to a size of the image display device 104. Further, the output tone correction section 17 carries out correction with respect to a text region of the R'G'B' image data with the use of the gamma curve of (b) of FIG. 8, and carries out a correction with respect to a region other than the text region of the R'G'B' image data with the use of the gamma curve of (a) of FIG. 8.

The R'G'B' image data outputted from the output tone correction section 17 is finally supplied to the image display device 104, and the image display device 104 carries out a preview display based on the R'G'B' image data.

In the transmission process and the preview display in the image transmission mode, the automatic document type discrimination section 5 may, not only determine whether a document image is a color document or a monochrome document, but also determine whether the document image is a black-and-white binary image (image made of black-and-white binary values) or a grayscale image in a case where the document image is determined as the monochrome document. Such a discrimination process is explained as below. Initially, in regard to an image determined as a monochrome document, the automatic document type discrimination section 5 forms a frequency distribution of a pixel value with respect to all pixels determined as black and white pixels (monochrome pixels). In a case where the frequency distribution is mainly made up of two peaks of a white pixel peak and a black pixel peak, the automatic document type discrimination section 5 determines the monochrome image as a binary image. In a case where the frequency distribution smoothly changes, the automatic document type discrimination section 5 determines the monochrome image as a grayscale image.

Furthermore, in a case where the automatic document type discrimination section 5 determines the document image as a grayscale image, the image forming apparatus 100 may display, on the image display device 104, identification information (for example, a text of "grayscale") to inform the user that the document image is a grayscale image. This allows the user to recognize that the document image to be transmitted is a grayscale image. In this case, the identification information to inform the user that the document image is a grayscale image is displayed with a preview image of the document image so that the identification information and the preview image do not overlap each other.

A preview display process carried out by the image forming apparatus 100 in the image transmission mode and the full-color mode is the same as the preview display process carried out in the copier mode and the full-color mode, and therefore is not explained here.

Further, a re-preview display process carried out by the image forming apparatus 100 in the image transmission mode is the same as the re-preview display process in the copier mode, and therefore is not explained here.

(4-3) User Interface of Image Display Device

With reference to FIG. 15, FIG. 19 through 21 explained is how a user interface is changed (screen shift) from the preview display in the image transmission mode to the re-preview display carried out when the user inputs an instruction to change the color setting.

FIG. 15 is a screen from which setting of whether the preview display is carried out or not is inputted, and shows a user interface displayed on the image display device 104. In a "color mode", the user can select, as a color setting, the full-color mode, the auto color selection mode, the grayscale mode, or the black and white binarization mode. Further, when a preview button is selected and a start button is pressed, "Preview Display: Yes" is set. When the preview button is not selected and the start button is pressed, "Preview Display: No" is set.

In a case where the user selects the grayscale mode as a "color mode" in the user interface of FIG. 15, the image display device 104 displays a preview in the grayscale mode.

Since the grayscale mode is set, "grayscale" is displayed as a document type, and a previewed image is also a grayscale image. Further, A "reset" button is a button to be selected when the color setting for a displayed document is to be changed. When the "reset" button is selected, a user interface for selecting the "color mode" is displayed on the image display device 104.

When the user selects the "color mode" to change the color setting, the user interface of FIG. 19 is displayed on the image display device 104.

FIG. 19 shows a user interface from which the full-color mode, the auto color selection mode, the grayscale mode, or the black and white binarization mode is selected as the "color mode". When the user selects any one of the modes (for example, the full-color mode), a confirmation screen as shown in FIG. 20 is displayed. When the user confirms the selected mode, a user interface of a re-preview display according to the reset color setting (for example, the full-color mode) is displayed on the image display device 104, as shown in FIG. 21.

(5) Modified Example

The image forming apparatus 100 shown in FIG. 1 stores compressed image data (encoded codes) and segmentation class signal codes in the storage device 107 so that they are correlated with each other. However, it is also possible to arrange, like an image forming apparatus 100*a* shown in FIG. 14, such that (i) image data is read out by an image input apparatus 101, and then compressed (encoded) and temporarily stored in a storage device 107 before a segmentation process and an automatic document type discrimination process are carried out; (ii) the image data is read out from the storage device 107 and decompressed (decoded), and then subjected to the automatic document type discrimination process and the segmentation process. In this case, in the automatic document type discrimination process, image data of each page of a document and a determination result ("full color" or "monochrome") of the automatic color discrimination process for the each page of the document are stored in the storage device 107 so that they are correlated with each other.

Further, the image forming apparatus 100 shown in FIG. 1 may be able to execute an image filing mode (image filing job) while any one of the copier mode, the print mode, the facsimile transmission mode, the facsimile reception mode, and the image transmission mode is being selected. The image filing mode is a mode in which, while a job, such as the copier mode, is being selected, an image file (JPEG, TIFF file, or the like) is formed based on image data inputted in the image input apparatus 101 or image data received from outside, and the image file is stored in the storage device 107.

At the filing in the image filing mode, the image processing apparatus 102 converts the image data inputted in the image input apparatus 101 or the image data received from the outside into an image file (JPEG, TIFF file, or the like), and then supplies the image file to a filing process section (a job apparatus). Subsequently, the image file is stored in the storage device 107 by the filing process section.

Further, in a case where a preview is carried out while any one of the jobs (the copier mode, the print mode, the facsimile transmission mode, and the like) is being selected, regardless of whether the image filing mode is executed or not, the image data inputted in the image input apparatus 101 or the image data received from the outside is processed in the image processing apparatus 102 and then transmitted to the image display device 104. Further, in the case where the preview is carried out while any one of the jobs is being selected, regardless of whether the image filing mode is executed or not, the image processing apparatus 102 carries out the same image processing. For example, at the time of the preview display in the copier mode, regardless of whether the image filing mode is executed or not, the image processing apparatus 102 carries out the processes as shown in FIG. 1. At the time of the preview display in the facsimile transmission mode, regardless of whether the image filing mode is executed or not, the image processing apparatus 102 carries out the processes as shown in FIG. 11.

(6) Automatic Color Discrimination Process Method

With reference to FIG. 22 through FIG. 24 explained is how the color/monochrome determination section 51 in the automatic document type discrimination section 5 carries out the automatic color discrimination process.

In the present embodiment, as the automatic color discrimination process carried out by the color/monochrome determination section 51, a document determination process method, disclosed in Japanese Patent Application Publication, Tokukai, No. 2005-286571, may be used, for example. The following deals with the process of the color/monochrome determination section adopting this method. The following describes the process with the use of RGB signals as input image data. However, it is also possible to carry out the process with the use of, as input image data, CMY signals that are complementary color signals of RGB signals, or CIE1976L*a*b* signals (CIE: Commission International del' Eclairage: International Commission on Illumination, L*: Luminance, a*, b*: chromaticity) which are obtained by transforming RGB signals.

Initially, the color/monochrome determination section 51 carries out a chromatic/achromatic pixel determination based on RGB density signals of a document. More specifically, the color/monochrome determination section 51 calculates respective average values (R', G', B') of RGB input signals (RGB density (pixel value) signals) in an n×m block (e.g., 3×3) with a target pixel as a center. Then, the color/monochrome determination section 51 obtains a maximum value and a minimum value among the calculated respective average values (R', G', B') of the RGB input signals (RGB density (pixel value) signals), and then a difference (maximum density difference value) between the maximum value and the minimum value. Subsequently, the obtained maximum density difference value is compared with a predetermined chromic pixel determination threshold (for example, 20). If the maximum density difference value is not less than the chromic pixel determination threshold, the target pixel is determined as a chromatic pixel, and if the maximum density difference value is less than the chromatic pixel determination threshold, the target pixel is determined as an achromatic pixel.

Then, the color/monochrome determination section forms a histogram with respect to data that is determined as the chromatic pixel by the chromatic/achromatic pixel determination.

Subsequently, the color/monochrome determination section 51 analyzes the histogram. More specifically, the color/monochrome determination section 51 detects a density value (pixel value) whose frequency value is largest in the chromatic pixel histogram, and regards the density value as a maximum-frequency density value. After that, the color/monochrome determination section 51 compares the obtained maximum-frequency density value with a predetermined density threshold (for example, 150). If the maximum-frequency density value is less than the density threshold, the document is determined as a color document. On the other hand, if the maximum-frequency density value is not less than the density threshold, the color/monochrome determination section 51 calculates a total frequency value (a total frequency value of a maximum density region) of a predetermined density-range region centering around the maximum-frequency density value, and compares the total frequency value with a predetermined achroma determination frequency threshold. If the total frequency value of the maximum density region is less than the achroma determination frequency threshold, the document is determined as a color document. Values of the density range are set to about the maximum-frequency density value ±8. Further, the achroma determination frequency threshold is set according to a ratio with respect to a total number of pixels determined as the chromatic pixel, and is set, for example, to a value obtained by multiplying the total number of the chromatic pixels by 90%.

The chromatic/achromatic pixel determination is carried out with respect to a signal of each color component. The document is determined as a monochrome document only when each of the RGB signals satisfies that a total frequency value in a maximum density region is not less than an achroma determination frequency threshold.

A partially-discolored (spotted) document, a document of colored paper or wholly-discolored paper, or the like document includes chromatic pixels. However, in accordance with the above determination process, it is possible to determine such a document as a monochrome document. The reason is as follows.

That is, in a chromatic-pixel histogram of a general color document, a peak is formed such that a range of a peak region becomes wider as the number of colors increases and a frequency becomes greater as a color region in the document becomes larger, as shown in FIG. 24. On the other hand, in a chromatic pixel histogram of the partially-discolored (spotted) document, one small peak having a narrow density region range is formed on a high density side in each of the signals because a discolored portion in the same color is formed in a part of the document (see FIG. 22). Further, similarly to the partially-discolored (spotted) document, a chromatic pixel histogram of the document of colored paper or wholly-discolored paper is also such that, though frequencies of chromatic pixels are large, a density in each of the signals becomes high and a peak having a narrow density region range is formed on a high density side because the document is wholly colored or discolored in the same color (see FIG. 23). As such, in the partially-discolored (spotted) document and the document of colored paper or wholly-discolored paper, the frequency at the peak depends on the total number of chromatic pixels in the document, and therefore it is possible to determine whether the document is chromatic or achromatic according to at which density value the peak is positioned and the frequencies in the density range.

Further, it is possible to appropriately process document data by adjusting each of the above thresholds as needed. In regard to each of these thresholds, a plurality of expected values may be stored in ROM (Read Only Memory) or the like so that a value to be stored in memory means (not shown), such as a memory, can be set by a switch or the like, as necessary.

Further, in the present embodiment, a document color type determination process method disclosed in Japanese Patent Application Publication, Tokukaihei, No. 4-282968 may be used as another automatic color discrimination process method carried out by the color/monochrome determination section 51. The method is as follows. Initially, it is determined whether each pixel is a color pixel or a monochrome pixel. In a case where it is detected that a not less than predetermined number of continuous color pixels are included in a given pixel group, the continuous color pixels are regarded as a color block. In a case where a not less than predetermined number of color blocks are included in one line, the line is counted as a color line. Then, if a document includes a predetermined number of color lines, the document is determined as a color image, and if not, the document is determined as a monochrome image. Further, the automatic color discrimination process method carried out by the color/monochrome determination section 51 may be a method in which pixels determined as chromatic pixels are counted in a whole document, and the document may be determined as a color document if the number of the chromatic pixels is not less than 7000, while the document may be determined as a monochrome document if the number of the chromatic pixels is less than 7000, for example.

Further, as a method for determining whether a pixel is chromatic or achromatic, the following well-known methods can be used, in addition to the aforementioned methods.

(a) A method of comparing a maximum value and a minimum value among RGB signals with a threshold THa. That is, the pixel is determined as a chromatic pixel in a case where the following formula is true, while the pixel is determined as an achromatic pixel in a case where the following formula is false.

$$\max(R,G,B) - \min(R,G,B) \geq THa$$

(b) A method in which absolute values of differences between any two of respective color components of RGB signals are calculated, and the absolute values are compared with a threshold. That is, the pixel is determined as a chromatic pixel in a case where any of the absolute values are not less than the threshold, while the pixel is determined as an achromatic pixel in a case where the absolute values are less than the threshold.

(7) Advantages of Image Processing Apparatus of Present Embodiment

The image processing apparatus 102 of the present embodiment supplies image data to the image output apparatus (a job apparatus, a printing apparatus) 103 that carries out a print job (copier mode, print mode), and also supplies the image data to the image display device 104 before the print job is executed, so that a preview of the image data is displayed on the image display device 104.

The image processing apparatus 102 includes a first image processing section that carries out: first image processing with respect to the image data to be supplied to the image output apparatus 103; and second image processing, different from the first image processing, with respect to the image data to be supplied to the image display device 104, the first image processing section carrying out the first and second image processing with the use of a circuit region shared by the first and second image processing. One example of the first image processing section may be the color correction section 13 in the copier mode and the full-color mode. The color correction section 13 carries out a conversion process (the first image processing) of converting RGB into CMY and a conversion process (the second image processing) of converting RGB into R'G'B', in a shared circuit region.

With the arrangement, even in an image processing apparatus that carries out not only image processing for the printing process or the like, but also image processing for a preview carried out before the printing process, it is possible to restrain a circuit size of an image processing circuit.

Further, in the present embodiment, at the time of printing in the copier mode and the full-color mode, the color correction section 13 converts image data (RGB) for additive color mixture that is read by a scanner and is adapted to scanner characteristics, into image data (CMY) for subtractive color mixture that is adapted to characteristics of the image output apparatus 103. Meanwhile, in previewing an image in the copier mode and the full-color mode, the color correction section 13 converts image data (RGB) for additive color mixture that is read by the scanner and is adapted to scanner characteristics, into image data (R'G'B') for additive color mixture that is adapted to characteristics of the image display device 104. That is, in displaying a preview, image data for additive color mixture that is adapted to the scanner characteristics is directly converted into image data for additive color mixture that is adapted to the characteristics of the image display device 104. Accordingly, the image processing apparatus 102 of the present embodiment is such that, at the time of the preview display in the copier mode and the full-color mode, nonlinear conversion from RGB image data to R'G'B' image data is carried out once, and nonlinear conversion is not required to be carried out several times unlike an arrangement disclosed in Japanese Patent Application Publication, Tokukaihei, No. 9-135316. As a result, it is possible to restrain accumulation of conversion errors and a decrease in color reproduction. In Japanese Patent Application Publication, Tokukaihei, No. 9-135316, conversion is carried out 4 times: conversion of RGB data into CMY data, conversion of the CMY data into CMYK data, conversion of the CMYK data into CMY data, and conversion of the CMY data into RGB data, thereby causing the accumulation of conversion errors and the decrease in color reproduction.

In the present embodiment, in previewing an image in the copier mode and the single-color mode, or in previewing an image in the copier mode and the two-color mode, the nonlinear conversion is carried out only twice. That is, in comparison with the arrangement disclosed in Japanese Patent Application Publication, Tokukaihei, No. 9-135316 in which the nonlinear conversion is carried out 4 times in total, it is possible to restrain the decrease in color reproduction.

Further at the time of printing in the copier mode and the full-color mode, the black generation and under color removal section 14 converts CMY image data into CMYK image data. Meanwhile, in previewing an image in the copier mode and the full-color mode, the black generation and under color removal section 14 outputs R'G'B' image data without processing the R'G'B' image data. As such, in regard to image data for printing that is necessarily subjected to the process (black generation and under color removal process) of converting CMY into CMYK and image data for preview that is not required to be subjected to the black generation and under color removal process, it is possible to share a path for such pieces of image data in the image processing circuit, thereby simplifying a circuit configuration.

The image processing apparatus 102 of the present embodiment can carry out image processing based on the determination result of the automatic document type discrimination section 5, image processing based on the processing result of the segmentation process section 6, and the page background removal process. Effects due to these processes are reflected on a preview image displayed on the image display device 104.

(Program, Storage Medium)

Finally, the blocks of the image processing apparatus 102 may be realized by way of hardware or software as executed by a CPU (Central Processing Unit) as follows.

The image processing apparatus 102 may include a computer-readable storage medium containing control program code (executable program, intermediate code program, or source program) for the image processing apparatus 102, which is software realizing the aforementioned functions, in order for the image processing apparatus 102 (or CPU, MPU) to retrieve and execute the program code contained in the storage medium.

The storage medium included in the image processing apparatus 102 may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The object of the present invention is also achievable in such a manner that the image processing apparatus 102 may be arranged to be connectable to a communications network. In this case, the program code may be delivered to the image processing apparatus 102 over the communications network. The communications network is not limited in any particular manner provided that the program code can be delivered to the image processing apparatus 102 via the communications network, and may be, for example, the Internet, an intranet, extranet, LAN, ISDN, VAN, CATV communications network, mobile communications network, or satellite communications network.

The transfer medium which makes up the communications network is not limited in any particular manner provided that the medium can transfer the program code, and may be, for example, wired line, such as IEEE 1394, USB (Universal Serial Bus), electric power line, cable TV line, telephone line, or ADSL (Asymmetric Digital Subscriber Line) line; or wireless, such as infrared radiation (IrDA, remote control), Bluetooth (registered trademark), 802.11 wireless, HDR, mobile telephone network, satellite line, or terrestrial digital network. The present invention encompasses a computer data signal embedded in a carrier wave, in which the program code is embodied electronically.

The image processing apparatus according to the present invention is such that the output control means generates, besides the output image data, image data for display from the color image data, following the color setting, so that an image of the color image data is to be displayed on an image display device, and supplies the image data for display to the image display device.

With the arrangement, it is possible to check an image to be outputted from a job apparatus, on the image display device. This allows a user to determine whether or not a change of the color setting is necessary, by checking the image thus displayed on the image display device. For example, assume that the user initially selects a monochrome mode even through the user recognizes that a document is a color document. In such a case, if the user determines that the full-color mode is preferable by checking an image displayed on the image display device, the user can easily change the color setting at the point. In the image processing apparatus according to the present invention, in a case where the document includes a plurality of pages, the color/monochrome determination means performs the determination on the color image data for each of the plurality of pages, and the storing means correlates and stores, for each of the plurality of pages, the determination results of the color/monochrome determination means and the color image data of the image in the storage device.

With the arrangement, even in a case where a document includes a plurality of pages containing a color page and a monochrome page, the image processing apparatus stores a determination result for each of the plurality of pages. This makes it advantageously possible that even if the color setting is changed to the auto color selection mode, the image processing apparatus can generate a document image of the color page in the full-color mode and a document image of the monochrome page in the monochrome mode and carry out output processing with respect to those document images, without reading the document from the image reading apparatus again.

The image processing apparatus according to the present invention is such that the color/monochrome determination means determines which image data the color image data indicates, image data of a color document, image data of a grayscale document, or a black-and-white binary image document, regardless of which color setting is selected, in a case where the color setting that is changed according to the change instruction received by the change instruction receiving means is an auto color selection mode, the output control means generates black-and-white multilevel image data as the output image data when the determination result stored in the storage device indicates the grayscale document, while the output control means generates black-and-white binary image data as the output image data when the determination result stored in the storage device indicates the black-and-white binary image document.

In the arrangement, in a case where a monochrome document read out by the image reading apparatus is a black-and-white binary image document, black-and-white binary image data is outputted as the output image data. As a result, it is advantageously possible to reduce burden of the image processing apparatus during the output processing, as compared to processing of black-and-white multilevel image data.

Further, an image reading processing apparatus having the same advantageous effect as above can be structured by the image processing apparatus and the image reading apparatus. Further, an image reading processing apparatus having the same advantageous effect as above can be structured by the image processing apparatus, the image reading apparatus, and image display device. Furthermore, an image forming apparatus having the same advantageous effect as above can be structured by the image processing apparatus and a job apparatus as a printing apparatus.

The image processing apparatus according to the present invention may be realized by a computer. In this case, an image processing computer of causing the computer to function as each means of the image processing apparatus so as to realize the image processing apparatus in the computer, and a computer-readable storage medium in which the image processing program is stored are also included in the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

The image processing apparatus according to the present invention can be used in an apparatus dealing with image data, especially preferably applied to a multifunction printer, a copying machine, a printer, and a facsimile device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An image processing apparatus comprising:
output control means for generating, from color data obtained by reading an image of a document as color with an image reading apparatus, output image data used in any one of an image print job, an image transmission job, and an image filing job, and outputting the generated output image data to a job apparatus that performs the corresponding job;
color-setting receiving means for receiving an instruction on color setting with respect to the output image data;
color/monochrome determination means for determining whether the color image data is image data indicative of a color document or image data indicative of a monochrome document, regardless of which color setting is selected with respect to the output data, the color setting having been received by the color-setting receiving means;
storing means for storing a determination result of the color/monochrome determination means and the color image data in a storage device in association with each other; and
change instruction receiving means for receiving a change instruction to change the color setting,
in a case where the change instruction receiving means receives the change instruction, the output control means generating the output image data, following a color setting that is changed according to the change instruction, on the basis of the determination result and the color image data each stored in the storage device.

2. The image processing apparatus as set forth in claim 1, wherein:
the output control means generates, besides the output image data, image data for display from the color image data, following the color setting, so that an image of the color image data is to be displayed on an image display device, and supplies the image data for display to the image display device.

3. The image processing device as set forth in claim 1, wherein:
in a case where the document includes a plurality of pages, the color/monochrome determination means performs the determination on the color image data for each of the plurality of pages, and the storing means correlates and stores, for each of the plurality of pages, the determination results of the color/monochrome determination means with the color image data of the image in the storage device.

4. The image processing device as set forth in claim 1, wherein:
the color/monochrome determination means determines which image data of the color image data indicates, image data of a color document, image data of a grayscale document, or a black-and-white binary image document, regardless of which color setting is selected,
in a case where the color setting that is changed according to the change instruction received by the change instruction receiving means is an auto color selection mode, the output control means generates black-and-white multi-level image data as the output image data when the determination result stored in the storage device indicates the grayscale document, while the output control means generates black-and-white binary image data as the output image data when the determination result stored in the storage device indicates the black-and-white binary image document.

5. An image reading processing apparatus comprising:
an image processing apparatus as set forth in claim 1; and
an image reading apparatus.

6. An image reading processing apparatus comprising:
an image processing apparatus as set forth in claim 2;
an image reading apparatus; and
an image display device.

7. An image forming apparatus comprising:
an image processing apparatus as set forth in claim 1; and
a job apparatus,
the job apparatus being a printing apparatus.

8. An image processing method comprising the steps of:
(a) carrying out output control of generating, from color image data obtained by reading an image of a document as color with an image reading apparatus, output image data used in any one of an image print job, an image transmission job, and an image filing job, and outputting the output image data to a job apparatus that performs the corresponding jobs;
(b) receiving an instruction on color setting with respect to the output image data;
(c) determining whether the color image data is image data indicative of a color document or image data indicative of a monochrome document, regardless of which color setting is selected with respect to the output image data, the color setting having been received in the step (b);
(d) storing a determination result in the step (c) and the color image data in a storage device in association with each other; and
(e) receiving a change instruction to change the color setting,
wherein in the step (a), the output image data, following a color setting that is changed according to the change instruction, is generated, on the basis of the determination result and the color image data each stored in the storage device.

9. A non-transitory computer-readable storage medium in which a program for causing a computer to operate as an image processing apparatus as set forth in claim 1 is stored, the program causing the computer to function as each means of the image processing apparatus.

10. An image processing apparatus comprising:
output control means for generating, from color image data obtained by reading an image of a document as color with an image reading apparatus, output image data used in any one of a print job, an image transmission job, and an image filing job, and outputting the generated output image data to a job apparatus that performs the corresponding job;
color/monochrome determination means for determining whether the color image data is image data indicative of a color document or image data indicative of a monochrome document, regardless of which color setting is selected with respect to the output image data;
storing means for storing a determination result of the color/monochrome determination means and the color image data in a storage device in association with each other; and
change instruction receiving means for receiving a change instruction to change the color setting, wherein in a case where the change instruction receiving means receives the change instruction, the output control means generates the output image data, following a color setting that is changed according to the change instruction, on the basis of the determination result and the color image data each stored in the storage device, the color/monochrome determination means determines which image data the color image data indicates, image data of a color document, image data of a grayscale document, or a black-and-white binary image document, regardless of which color setting is selected, and in a case where the color setting that is changed according to the change instruction received by the change instruction receiving means is an auto color selection mode, the output control generates black-and-white multilevel image data as the output image data when the determination result stored in the storage device indicates the grayscale document, while the output control means generates black-and-white binary image data as the output image data when the determination result stored in the storage device indicates the black-and-white binary image document.

* * * * *

UNITED STATES PATENT AND TRADEMARK OFFICE
CERTIFICATE OF CORRECTION

PATENT NO. : 8,355,168 B2  Page 1 of 1
APPLICATION NO. : 12/586957
DATED : January 15, 2013
INVENTOR(S) : Makio Gotoh It is certified that error appears in the above-identified patent and that said Letters Patent is hereby corrected as shown below:

Title Page, Item (54) and in the Specification, Column 1, lines 1-8, please correct the title to be as follows:

-- <u>IMAGE</u> PROCESSING APPARATUS, IMAGE READING PROCESSING APPARATUS, IMAGE FORMING APPARATUS, IMAGE PROCESSING METHOD, AND STORAGE MEDIUM, ALL OF WHICH CARRY OUT AUTOMATIC COLOR SELECTION (ACS) REGARDLESS OF COLOR SETTING OF OUTPUT IMAGE DATA --

Signed and Sealed this
Thirteenth Day of August, 2013

Teresa Stanek Rea
*Acting Director of the United States Patent and Trademark Office*